United States Patent
Kuang

(10) Patent No.: US 12,496,943 B2
(45) Date of Patent: Dec. 16, 2025

(54) LIFTING BASKET CHILD SAFETY SEAT

(71) Applicant: GOODBABY CHILD PRODUCTS CO., LTD., Jiangsu (CN)

(72) Inventor: Zhiyong Kuang, Jiangsu (CN)

(73) Assignee: GOODBABY CHILD PRODUCTS CO., LTD., Kunshan (CN)

( * ) Notice: Subject to any disclaimer, the term of this patent is extended or adjusted under 35 U.S.C. 154(b) by 291 days.

(21) Appl. No.: 18/044,048

(22) PCT Filed: Dec. 28, 2020

(86) PCT No.: PCT/CN2020/140154
§ 371 (c)(1),
(2) Date: Mar. 3, 2023

(87) PCT Pub. No.: WO2022/048079
PCT Pub. Date: Mar. 10, 2022

(65) Prior Publication Data
US 2024/0017652 A1    Jan. 18, 2024

(30) Foreign Application Priority Data

Sep. 4, 2020 (CN) .......................... 202010919477.5

(51) Int. Cl.
*B60N 2/28*        (2006.01)

(52) U.S. Cl.
CPC ......... *B60N 2/2845* (2013.01); *B60N 2/2824* (2013.01); *B60N 2/2839* (2013.01); *B60N 2/2884* (2013.01)

(58) Field of Classification Search
CPC ... B60N 2/2821; B60N 2/2884; B60N 2/2839
See application file for complete search history.

(56) References Cited

U.S. PATENT DOCUMENTS

| | | | |
|---|---|---|---|
| 6,428,100 B1 * | 8/2002 | Kain | B60N 2/2845 297/130 |
| 6,439,660 B1 | 8/2002 | Guenther | |

(Continued)

FOREIGN PATENT DOCUMENTS

| | | | | |
|---|---|---|---|---|
| CN | 103129424 A | * | 6/2013 | ........... B60N 2/2821 |
| CN | 205468638 U | | 8/2016 | |

(Continued)

OTHER PUBLICATIONS

International Search Report and Written Opinion issued for International Patent Application No. PCT/CN2020/140154, dated May 27, 2021 in 10 pages.

*Primary Examiner* — Timothy J Brindley
(74) *Attorney, Agent, or Firm* — MUNCY, GEISSLER, OLDS & LOWE, P.C.

(57) ABSTRACT

Disclosed is a lifting basket child safety seat, including: a base; a lifting basket detachably arranged on the base; a protection block located on an outer side of the base and rotationally connected to a left side and a right side of the base respectively; and a first locking mechanism for locking a position of the protection block. When the first locking mechanism is in a locked state, the protection block is supported on an outer side of the lifting basket in a standing manner, and when the first locking mechanism is in an unlocked state, the protection block is capable of rotating downwards relative to the base and/or towards an outer side of the lifting basket child safety seat, such that the protection block is capable of being away from the lifting basket.

10 Claims, 26 Drawing Sheets

(56) References Cited

U.S. PATENT DOCUMENTS

| | | | | |
|---|---|---|---|---|
| 8,876,208 B2* | 11/2014 | Heisey | ................ | B60N 2/2827 |
| | | | | 297/130 |
| 9,597,986 B2* | 3/2017 | Hou | ........................ | B60N 2/43 |
| 9,676,303 B2* | 6/2017 | Hou | ..................... | B60N 2/2845 |
| 10,150,390 B2* | 12/2018 | Sedlack | ............... | B60N 2/2821 |
| 11,413,991 B2* | 8/2022 | Zhao | .................... | B60N 2/2821 |
| 11,745,629 B2* | 9/2023 | Mo | ..................... | B60N 2/4235 |
| | | | | 297/216.11 |
| 2008/0315647 A1 | 12/2008 | Carine | | |
| 2011/0298259 A1* | 12/2011 | Heisey | ................ | B60N 2/2821 |
| | | | | 297/256.16 |
| 2015/0336482 A1 | 11/2015 | Pos | | |
| 2018/0056822 A1 | 3/2018 | Dorel et al. | | |
| 2020/0391627 A1* | 12/2020 | Williams | ............. | B60N 2/2869 |
| 2021/0016692 A1* | 1/2021 | Guo | ..................... | B60N 2/2887 |
| 2022/0009386 A1* | 1/2022 | Cui | ..................... | B60N 2/2827 |
| 2024/0010106 A1* | 1/2024 | Mo | ..................... | B60N 2/2887 |

FOREIGN PATENT DOCUMENTS

| | | | | |
|---|---|---|---|---|
| CN | 205853937 U | | 1/2017 | |
| CN | 206383856 U | | 8/2017 | |
| CN | 109228975 A | * | 1/2019 | ........... B60N 2/2821 |
| CN | 111845485 A | * | 10/2020 | ........... B60N 2/2821 |
| CN | 213831424 U | | 7/2021 | |
| CN | 113815501 A | * | 12/2021 | ........... B60N 2/2824 |
| CN | 114379431 A | * | 4/2022 | ........... B60N 2/2821 |
| CN | 114633670 A | * | 6/2022 | ........... B60N 2/2821 |
| EP | 2769876 A1 | * | 8/2014 | ........... B60N 2/2806 |
| EP | 3564067 A1 | | 11/2019 | |

* cited by examiner

LIFTING BASKET CHILD SAFETY SEAT

CROSS-REFERENCE TO RELATED APPLICATIONS

This application is the U.S. National Phase under 35. U.S.C. § 371 of International Application PCT/CN2020/140154, filed Dec. 28, 2020, which claims priority to Chinese Patent Application No. 202010919477.5, filed Sep. 4, 2020. The disclosures of the above-described applications are hereby incorporated by reference in their entirety.

TECHNICAL FIELD

The present disclosure relates to the field of children products, and in particular, to a lifting basket child safety seat.

BACKGROUND

Child safety seats are widely used because they can provide safety for children's riding. When a frontal collision occurs in a vehicle, children in the vehicle rush forward due to inertia. This forward movement can be limited by the safety device on the child safety seat. If there is no child safety seat to protect children, it will cause certain damage to children. Basket-type child safety seats are generally used for smaller infants and young children. Basket-type child safety seats generally include a base and a basket. The basket is detachably arranged on the base. In the prior art, the basket is inconvenient to removal and installation, and a large space is required for removal and installation, which is not convenient for the use of child safety seats.

SUMMARY

The purpose of the present disclosure is aimed at the deficiencies of the prior art, and provides an improved lifting basket child safety seat.

To achieve the above purpose, a technical solution employed by the present disclosure is:

A lifting basket child safety seat comprises a base and a lifting basket detachably arranged on the base, and further comprises a protection block located on an outer side of the base and rotationally connected to a left side and a right side of the base respectively, and a first locking mechanism for locking the position of the protection block, when the first locking mechanism is in a locked state, the protection block is supported on the outer side of the lifting basket in a standing manner, and when the first locking mechanism is in an unlocked state, the protection block can rotate downwards relative to the base and/or towards an outer side of the lifting basket child safety seat, such that the protection block can be away from the lifting basket.

Preferably, the first locking mechanism comprises a first lock pin slidably arranged on one of the base and the protection block, and a lock slot arranged on the other one of the base and the protection block, the lock slot is matched with the first lock pin, when the first locking mechanism is in the locked state, the first lock pin is inserted in the lock slot, and when the first locking mechanism is in the unlocked state, the first lock pin is removed from the lock slot, the first locking mechanism further comprises a first elastic element for driving the first locking mechanism to reset from the unlocked state to the locked state.

Further, the lifting basket child safety seat further comprises a first unlocking mechanism for driving the first locking mechanism to unlock, the first unlocking mechanism comprises a first unlocking member slidably arranged on the base or the protection block, the first unlocking member is connected to or matched with the first lock pin.

Preferably, the lifting basket child safety seat further comprises a second locking mechanism for locking the relative positions of the lifting basket and the base, the second locking mechanism comprises a second lock pin fixedly arranged on the lifting basket, and a lock hook rotatably arranged on the base, the lock hook has a hook slot matched with the second lock pin, when the second locking mechanism is in a locked state, the second lock pin is clamped in the hook slot of the lock hook, and when the second locking mechanism is in an unlocked state, the second lock pin is removed from the hook slot of the lock hook, the second locking mechanism further comprises a second elastic element for driving the second locking mechanism to reset from the unlocked state to the locked state.

Further, the lifting basket child safety seat further comprises a second unlocking mechanism for driving the second locking mechanism to unlock, the second unlocking mechanism comprises a second unlocking member slidably arranged on the base, the second unlocking member is connected to the lock hook via a first connector, the first connector is a first flexible connector.

Preferably, the lifting basket child safety seat further comprises a first unlocking mechanism and a second locking mechanism for locking the relative positions of the lifting basket and the base, the first unlocking mechanism is respectively connected to or matched with the first locking mechanism and the second locking mechanism, and when the first unlocking mechanism is operated, the first locking mechanism and the second locking mechanism are driven to unlock simultaneously.

Further, the first locking mechanism comprises a first lock pin slidably arranged on the protection block, and a lock slot arranged on the base and able to be matched with or detached from the first lock pin, the second locking mechanism comprises a second lock pin fixedly arranged on the lifting basket, and a lock hook rotatably arranged on the base and matched with or detached from the second lock pin, the first unlocking mechanism comprises a first unlocking member slidably arranged on the base or the protection block, the first unlocking member is connected to or matched with the first lock pin, the lifting basket child safety seat further comprises a sliding block slidably arranged on the base, a second flexible connector and a third elastic element, the sliding block is matched with the first lock pin via a slope, two end portions of the second flexible connector are fixedly connected to the sliding block and the lock hook respectively, and two end portions of the third elastic element are arranged on the sliding block and the base respectively.

Preferably, the lifting basket child safety seat further comprises a second locking mechanism for locking the relative positions of the lifting basket and the base and a second unlocking mechanism, the second unlocking mechanism is respectively connected to the first locking mechanism and the second locking mechanism, and when the second unlocking mechanism is operated, the first locking mechanism and the second locking mechanism are driven to unlock simultaneously.

Further, the first locking mechanism comprises a first lock pin slidably arranged on the base, and a lock slot arranged on the protection block and able to be matched with or detached from the first lock pin, the second locking mechanism comprises a second lock pin fixedly arranged on the lifting basket, and a lock hook rotatably arranged on the base and matched with or detached from the second lock pin, the second unlocking mechanism comprises a second unlocking member slidably arranged on the base, the second unlocking member is connected to the lock hook via a first connector, and the second unlocking member is connected to the first lock pin via a third flexible connector.

Preferably, the lifting basket child safety seat further comprises a second locking mechanism for locking the relative positions of the lifting basket and the base, and when the first locking mechanism is unlocked and the protection block is rotated relative to the base in a direction away from the base, the second locking mechanism is driven to unlock, the lifting basket child safety seat further comprises a second connector for connecting the protection block to the second locking mechanism.

Further, the second locking mechanism comprises a second lock pin fixedly arranged on the lifting basket, and a lock hook rotatably arranged on the base and matched with or detached from the second lock pin, and the second connector is a fourth flexible connector, two end portions of the fourth flexible connector are respectively connected to the protection block and the lock hook.

Preferably, the protection block is rotatably connected to the base via a rotation shaft, the rotation shaft is located at the front end portion of the protection block, the rotation shaft extends in a left-right direction, and when the first locking mechanism is in the unlocked state, the protection block can rotate downwards relative to the base around the rotation shaft.

Preferably, the protection block is rotatably connected to the base via a rotation shaft, the rotation shaft is located at the front end portion of the protection block, the rotation shaft extends in an up-down direction, and when the first locking mechanism is in the unlocked state, the protection block can rotate towards the outer side of the lifting basket child safety seat relative to the base around the rotation shaft.

Preferably, the protection block is rotatably connected to the base via a rotation shaft, the rotation shaft is located in the middle of the protection block, the rotation shaft extends in a front-rear direction, and when the first locking mechanism is in the unlocked state, the protection block can rotate towards the outer side of the lifting basket child safety seat relative to the base around the rotation shaft and rotate downwards.

Due to the use of the above technical solutions, the present disclosure has the following advantages over the prior art: The lifting basket child safety seat of the present disclosure is simple in structure, and when the lifting basket needs to be installed on the base or removed from the base, the protection block can be made to rotate downwards relative to the base to the lower part of the base or towards the outer side of the lifting basket child safety seat, which allows the protection block to be away from the lifting basket, leaving most of the lifting basket exposed for easy operation, such that the lifting basket is installed on the base or removed from the base; and when the protection block rotate downwards to the lower part of the base or to the outer side of the lifting basket child safety seat, the space size occupied by the protection block mostly overlaps with the base, so that the space size occupied by the protection block alone is small, that is, only a small space needs to be reserved to achieve the flipping of the protection block, so as to achieve the installation or removal of the lifting basket.

BRIEF DESCRIPTION

DETAILED DESCRIPTION OF EXEMPLARY EMBODIMENTS

Figure 1:
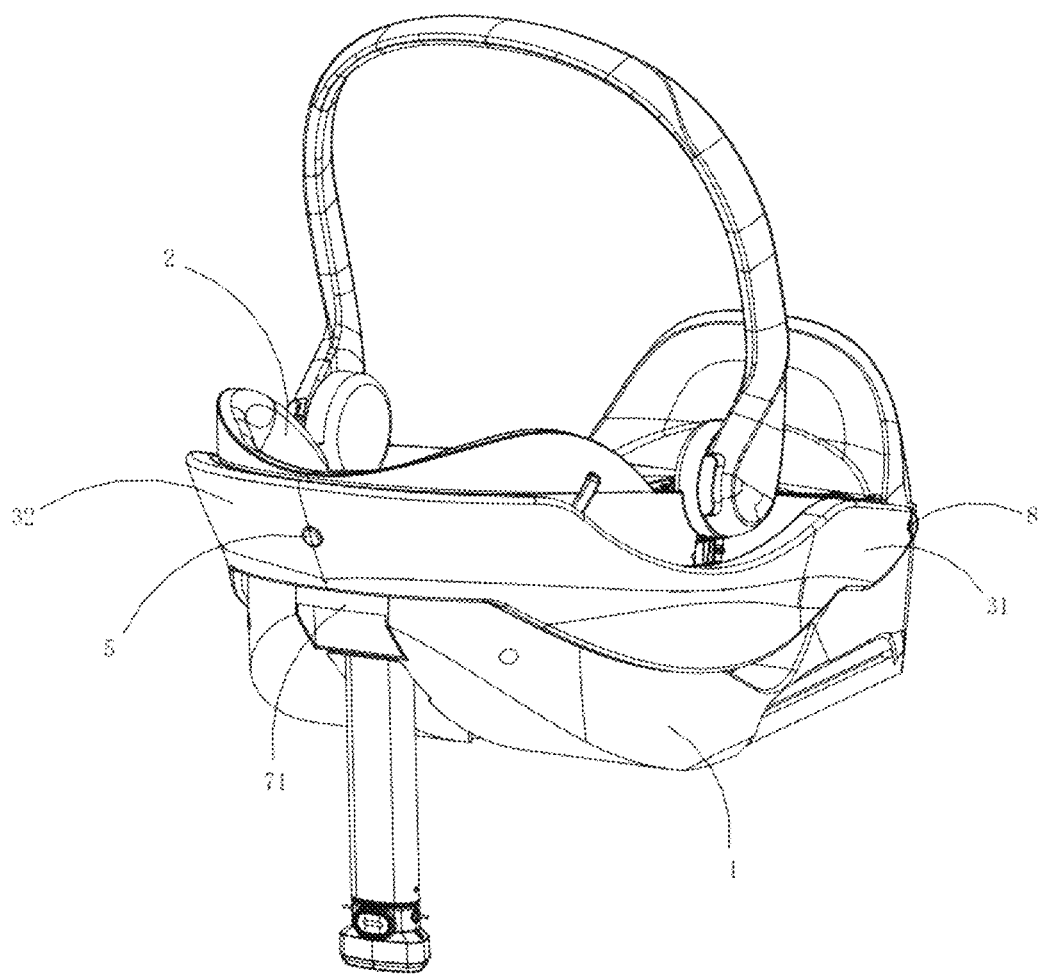
FIG. 1 is a schematic structure diagram of the lifting basket child safety seat of the present disclosure (Embodiment 1, the rotation shaft extends along the left-right direction, the lifting basket is installed on the base, and the first locking mechanism and the second locking mechanism are both in the locked state)

In the following, the technical solution of the present disclosure is further described combining with the accompanying drawings and specific embodiments.

As shown in FIGS. 1 to 36, the lifting basket child safety seat of the present disclosure comprises a base 1, a lifting basket 2 detachably arranged on the base 1, and a protection block 3.

The lifting basket 2 comprises a seat part 21 for supporting the baby's hip, a backrest 22 for supporting the baby's back and side blocks 23, the seat part 21 extends downwards from the front to the rear in an inclined manner, the backrest 22 extends backwards and upwards from the rear of the seat part 21 in an inclined manner, the seat part 21 and the backrest 22 are integrally provided, the side block 23 extends along the front-rear direction, the front parts of the side blocks 23 are fixedly arranged on the front of the seat part 21 and the rear parts are fixedly arranged on the backrest 22.

The protection block 3 is located on the outer side of the base 1, and the protection block 3 is rotatably arranged on the base 1 via a rotation shaft 8, the rotation shaft 8 can extend along the left-right direction, or along the up-down direction, or along the front-rear direction.

When the rotation shaft 8 extends along the left-right direction, the protection block 3 can rotate up and down relative to the base 1, as shown in FIGS. 1 to 5, FIGS. 7 to 10, FIG. 12, FIG. 14, FIG. 17, FIG. 20, FIG. 22, FIG. 24, FIG. 26 and FIG. 28. At this time, the protection block 3 comprises side guard bars 31 on the left and right sides and a transverse guard bar 32 connected between the side guard bars 31 on the left and right sides, and the protection block 3 is an integral structure, and the whole structure is a U-shaped structure with an opening facing forward, front end portions of the side guard bars 31 on the left and right sides are rotatably connected to the base 1 via the rotation shaft 8 extending in the left-right direction.

Figure 29:
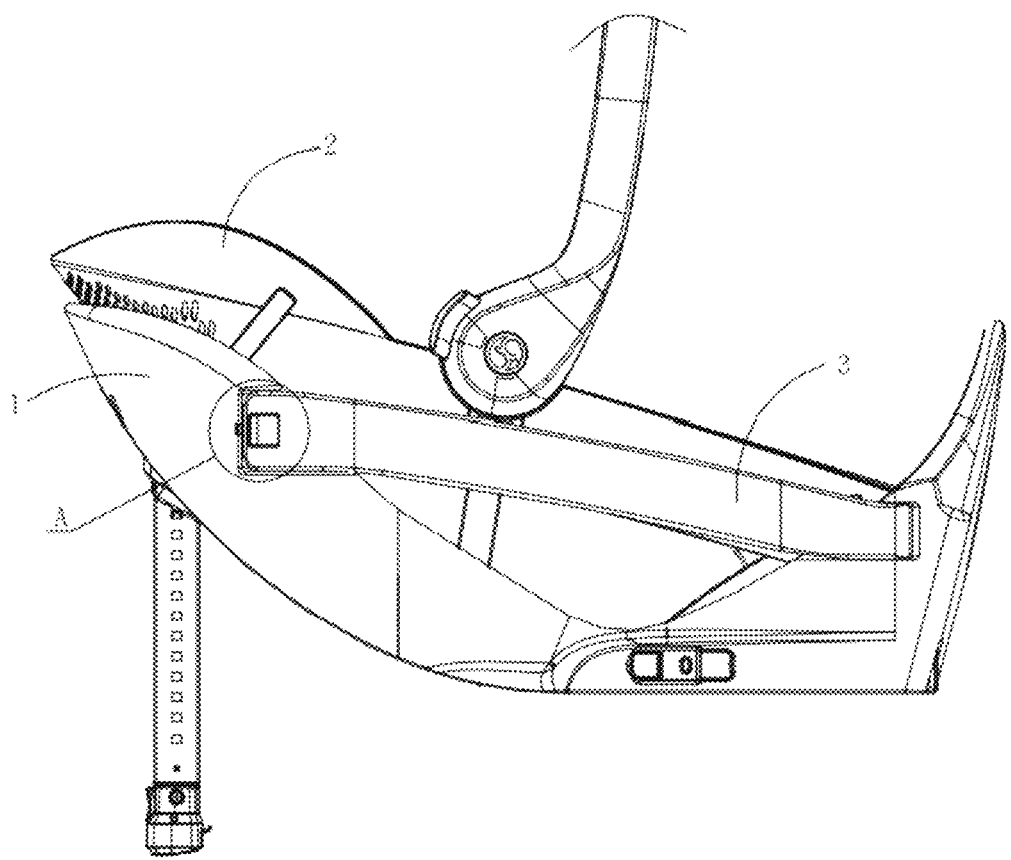
FIG. 29 is a schematic diagram of the inner structure of the lifting basket child safety seat of the present disclosure (Embodiment 4, the rotation shaft extends along the up-down direction, and the first locking mechanism and the second locking mechanism are both in the locked state)
Figure 30:
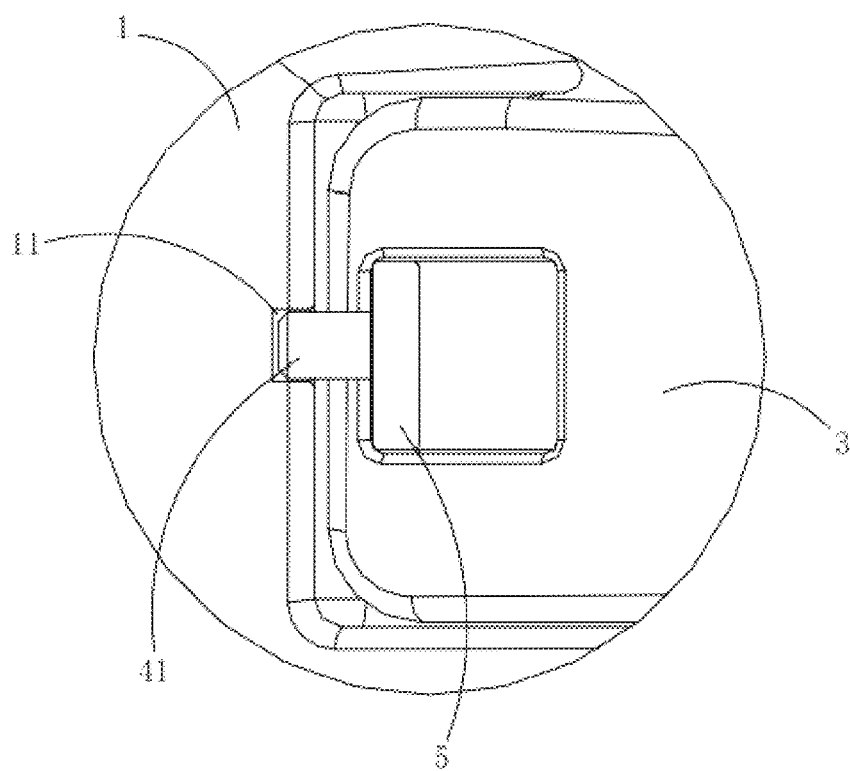
FIG. 30 is a partially enlarged view at Part A in FIG. 29.
Figure 31:
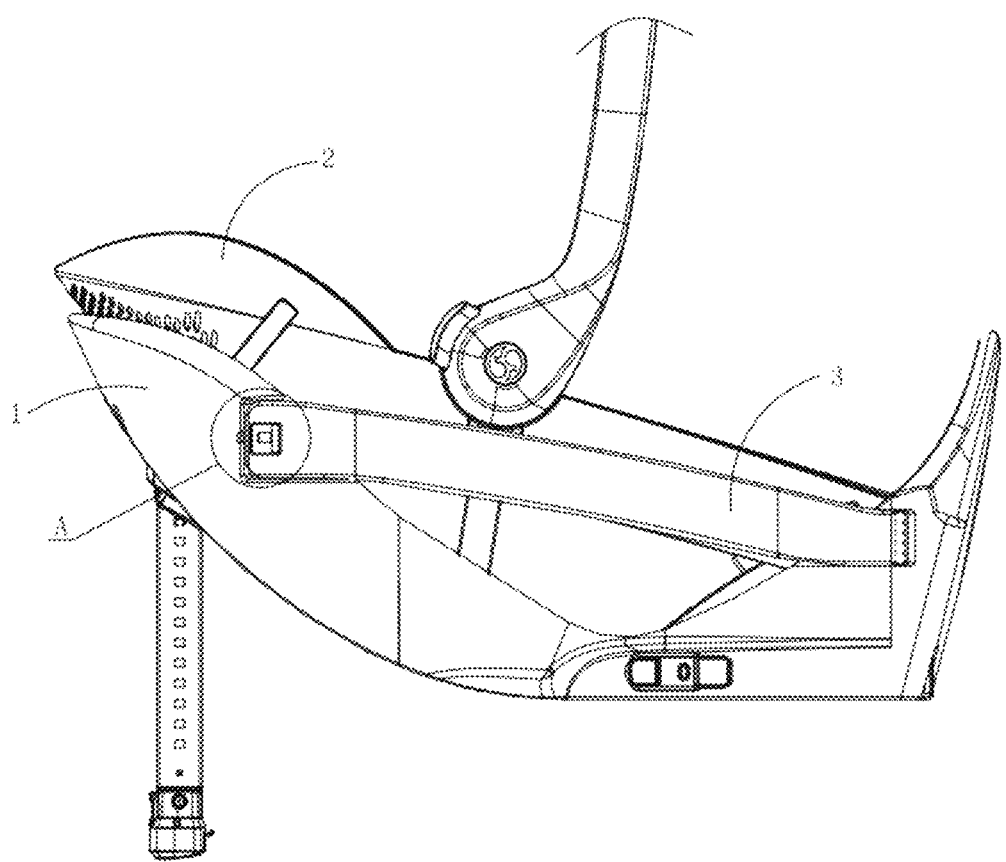
FIG. 31 is a schematic diagram of the inner structure of the lifting basket child safety seat of the present disclosure (Embodiment 4, the rotation shaft extends along the up-down direction, the first locking mechanism is in the unlocked state, and the second locking mechanism is in the locked state)
Figure 32:
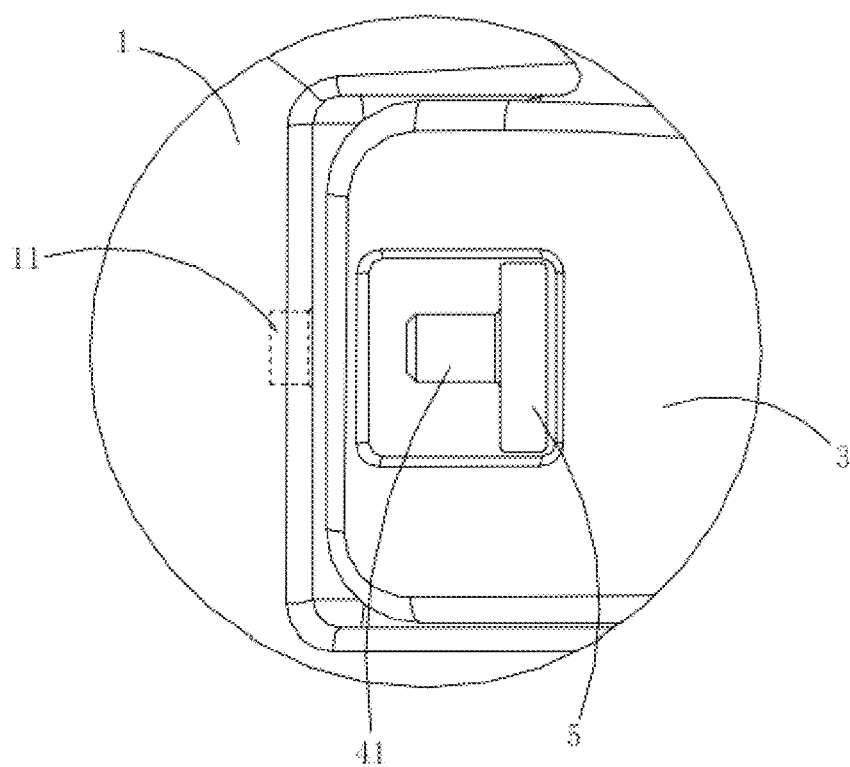
FIG. 32 is a partially enlarged view at Part A in FIG. 31.
Figure 33:
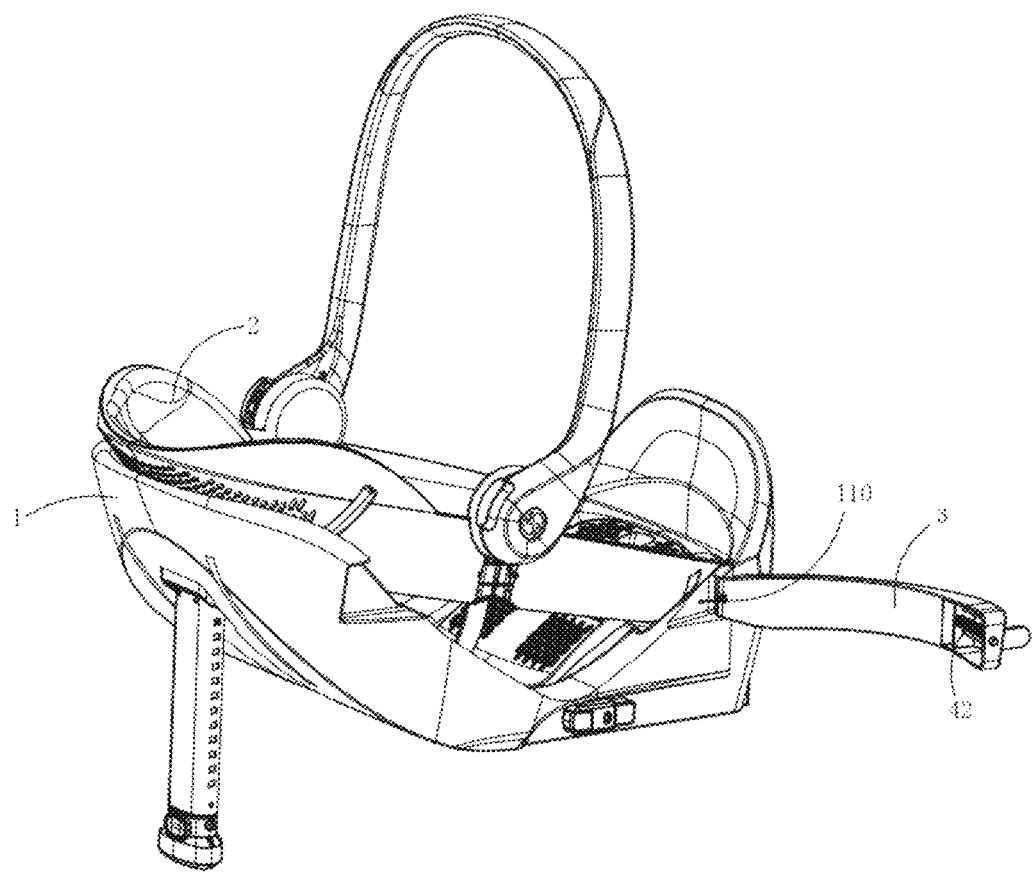
FIG. 33 is a schematic diagram of the inner structure of the lifting basket child safety seat of the present disclosure (Embodiment 4, the rotation shaft extends along the up-down direction, and the first locking mechanism and the second locking mechanism are both in the unlocked state)

When the rotation shaft 8 extends along the up-down direction, the protection block 3 can rotate left and right relative to the base 1, as shown in FIG. 29, FIG. 31 and FIG. 33. At this time, the protection block 3 comprises side guard bars 31 on the left and right sides, the side guard bars 31 on the left and right sides are separately provided, and front end portions of the side guard bars 31 on the left and right sides are rotatably connected to the base 1 via the rotation shaft 8 extending in the up-down direction.

Figure 34:
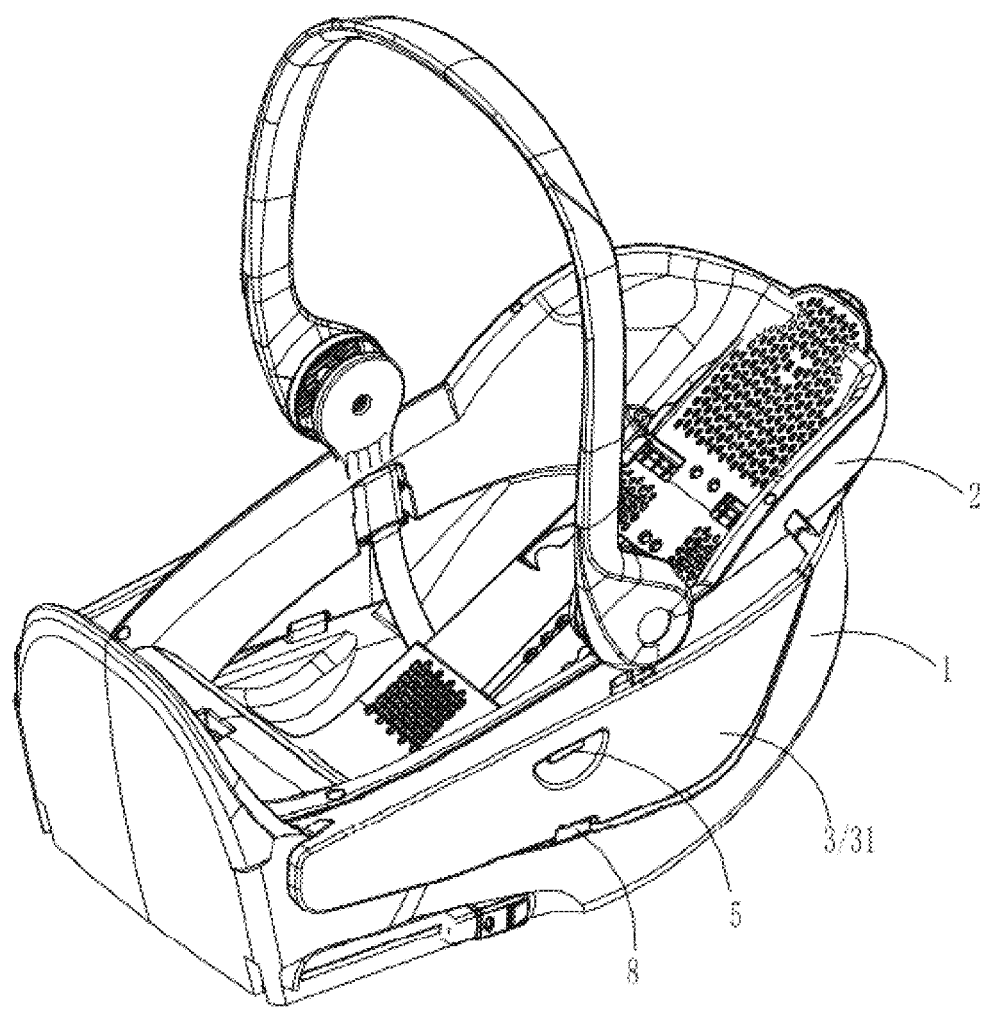
FIG. 34 is a schematic structure diagram of the lifting basket child safety seat of the present disclosure (a three-dimensional view, Embodiment 5, the rotation shaft extends along the front-rear direction, the lifting basket is installed on the base, and the first locking mechanism and the second locking mechanism are both in the locked state)
Figure 35:
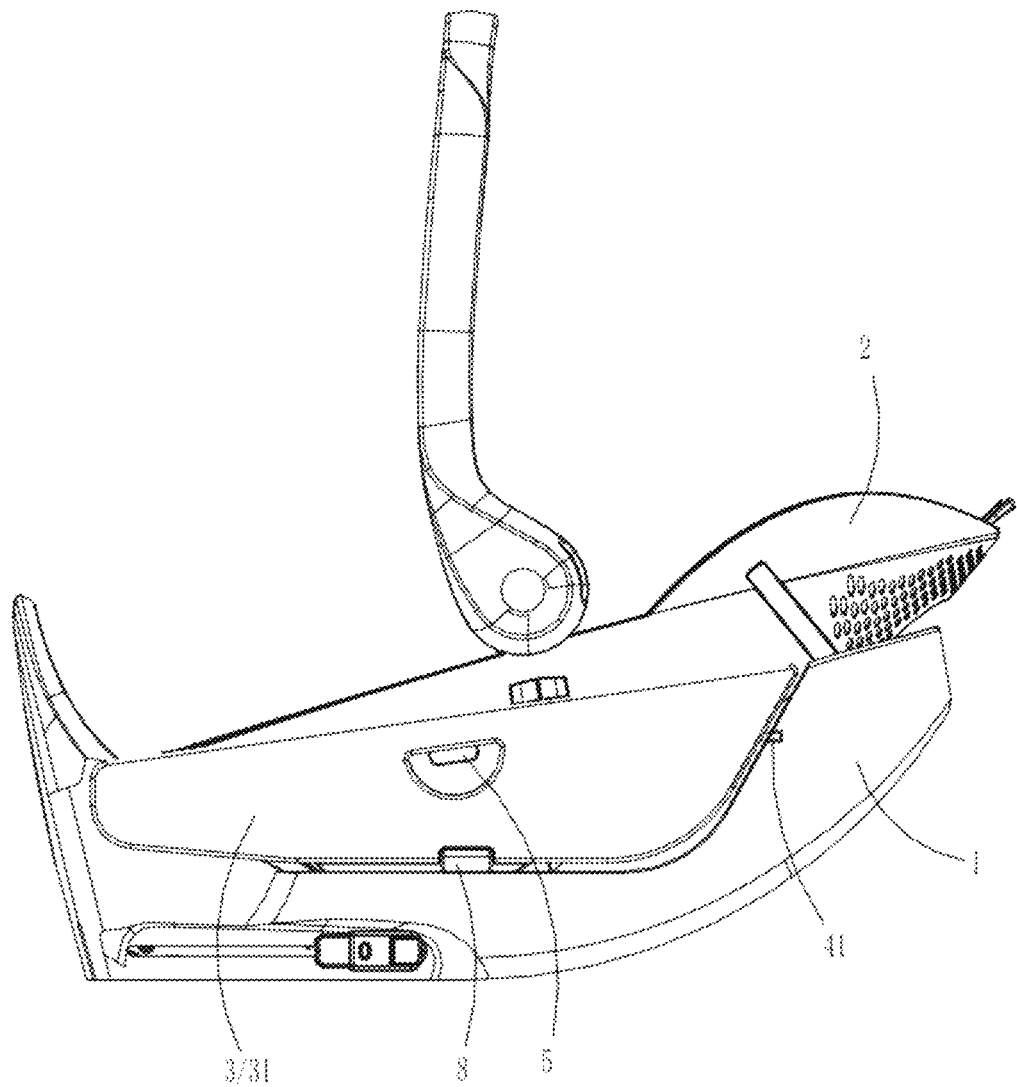
FIG. 35 is a schematic structure diagram of the lifting basket child safety seat of the present disclosure (a side view, Embodiment 5, the rotation shaft extends along the front-rear direction, the lifting basket is installed on the base, and the first locking mechanism and the second locking mechanism are both in the locked state)
Figure 36:
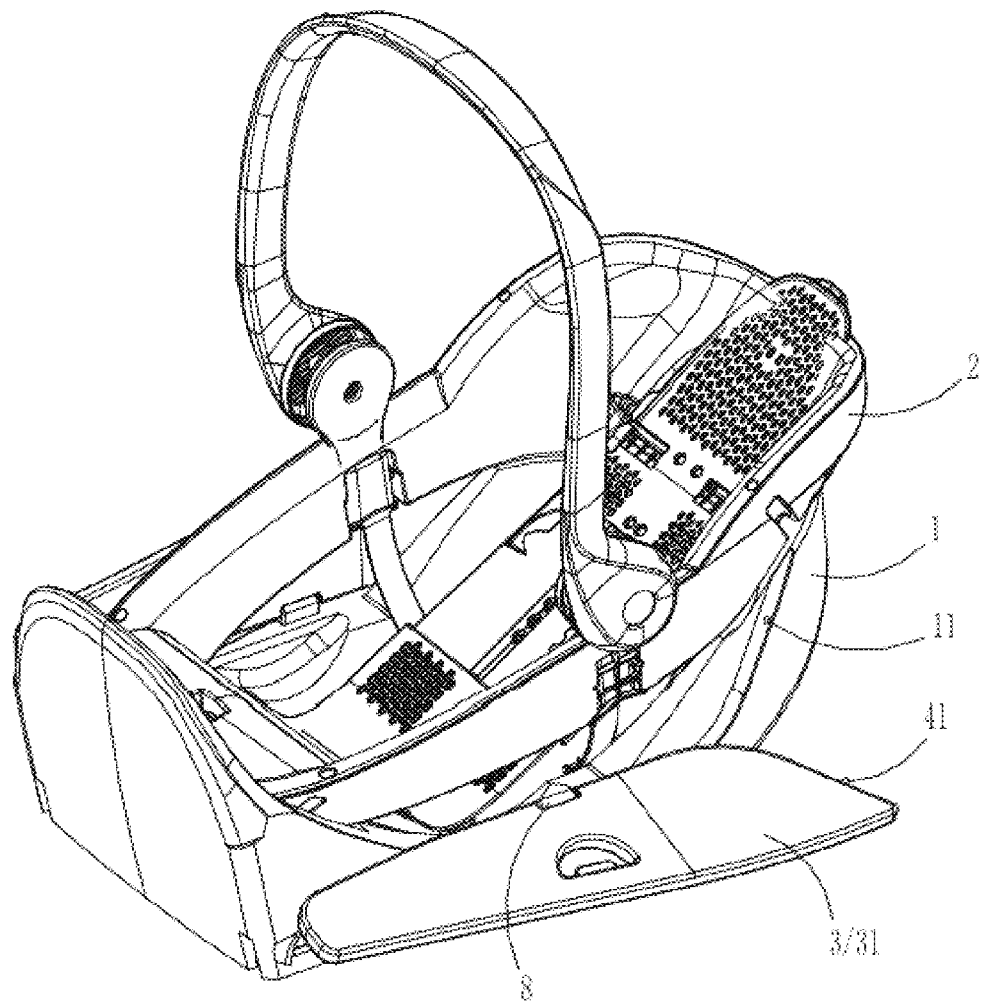
FIG. 36 is a schematic structure diagram of the lifting basket child safety seat of the present disclosure (a three-dimensional view, Embodiment 5, the rotation shaft extends along the front-rear direction, the lifting basket is installed on the base, and the first locking mechanism and the second locking mechanism are both in the unlocked state).

When the rotation shaft 8 extends along the front-rear direction, the protection block 3 can rotate left and right relative to the base 1 and rotate up and down at the same time, as shown in FIG. 34 to FIG. 36. At this time, the protection block 3 comprises side guard bars 31 on the left and right sides, the side guard bars 31 on the left and right sides are separately provided, and middle portions of the side guard bars 31 on the left and right sides are rotatably connected to the base 1 via the rotation shaft 8 extending in the front-rear direction.

The lifting basket child safety seat further comprises a first locking mechanism for locking the position of the protection block 3, and a second locking mechanism for locking the relative positions of the lifting basket 2 and the base 1 after the lifting basket 2 is installed on the base 1, and both the first locking mechanism and the second locking mechanism have locked states and unlocked states.

Figure 3:
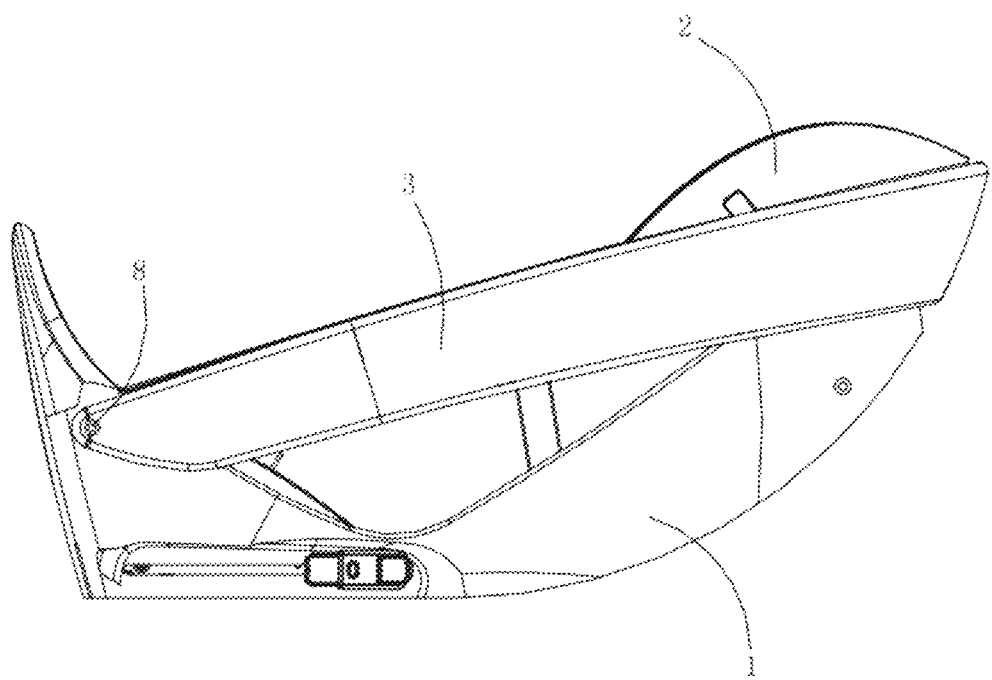
FIG. 3 is a schematic structure diagram of the lifting basket child safety seat of the present disclosure (Embodiment 1, the rotation shaft extends along the left-right direction, part of the base and the carry handle of the lifting basket are removed, the lifting basket is installed on the base, and the first locking mechanism and the second locking mechanism are both in the locked state)
Figure 4:
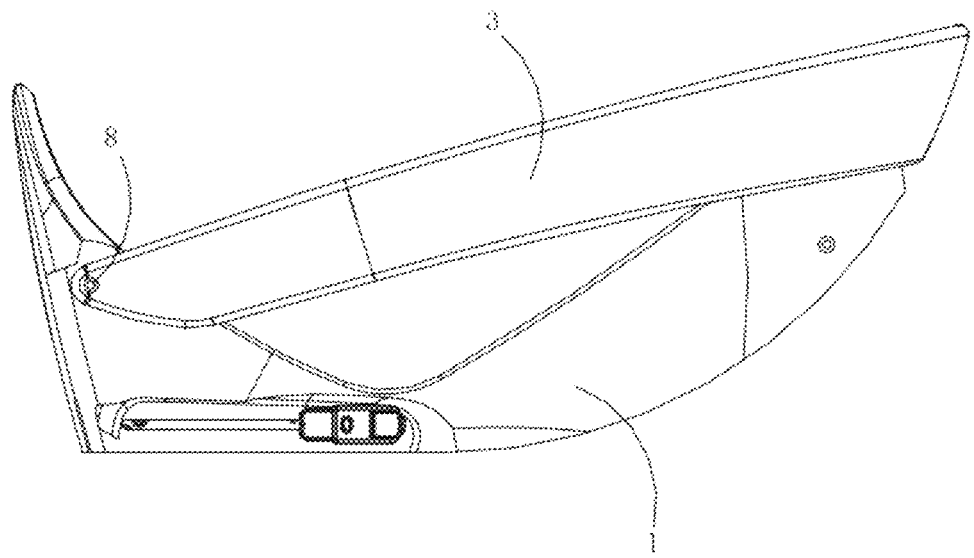
FIG. 4 is a schematic structure diagram of the lifting basket child safety seat of the present disclosure with the lifting basket removed (Embodiment 1, the rotation shaft extends along the left-right direction, part of the base is removed, and the first locking mechanism is in the locked state)
Figure 5:
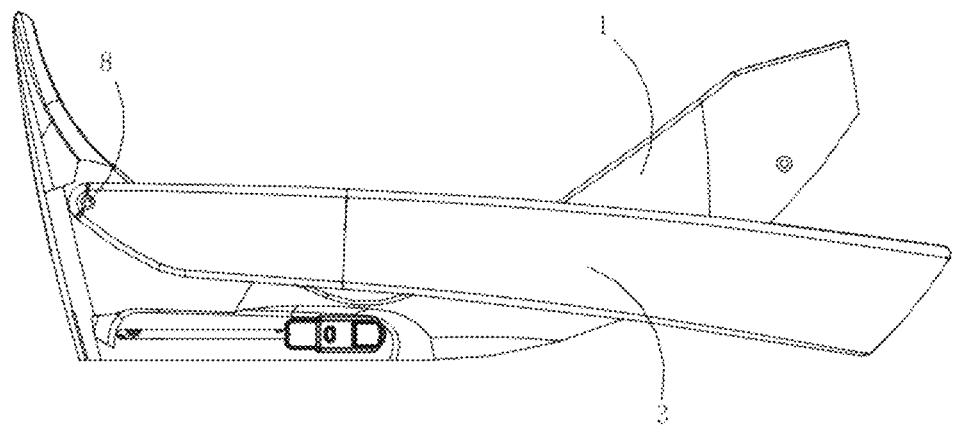
FIG. 5 is a schematic structure diagram of the lifting basket child safety seat of the present disclosure with the lifting basket removed (Embodiment 1, the rotation shaft extends along the left-right direction, part of the base is removed, and the first locking mechanism is in the unlocked state)
Figure 6:
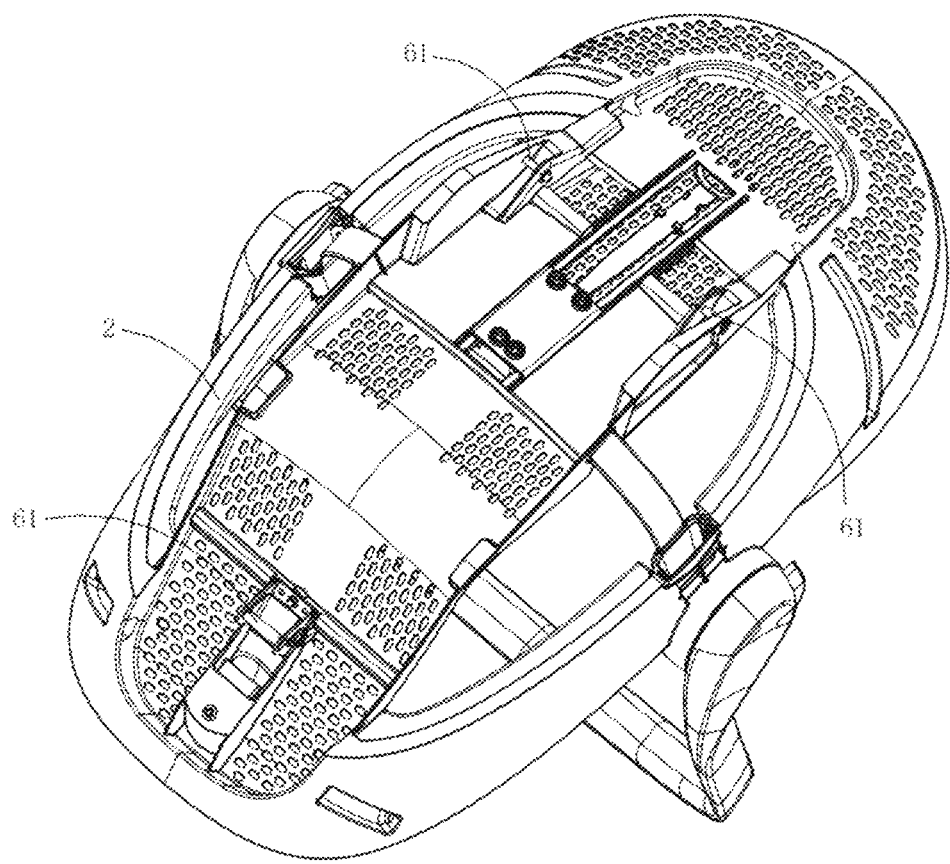
FIG. 6 is a schematic structure diagram of the lifting basket of the lifting basket child safety seat of the present disclosure (viewing from the bottom up)
Figure 7:
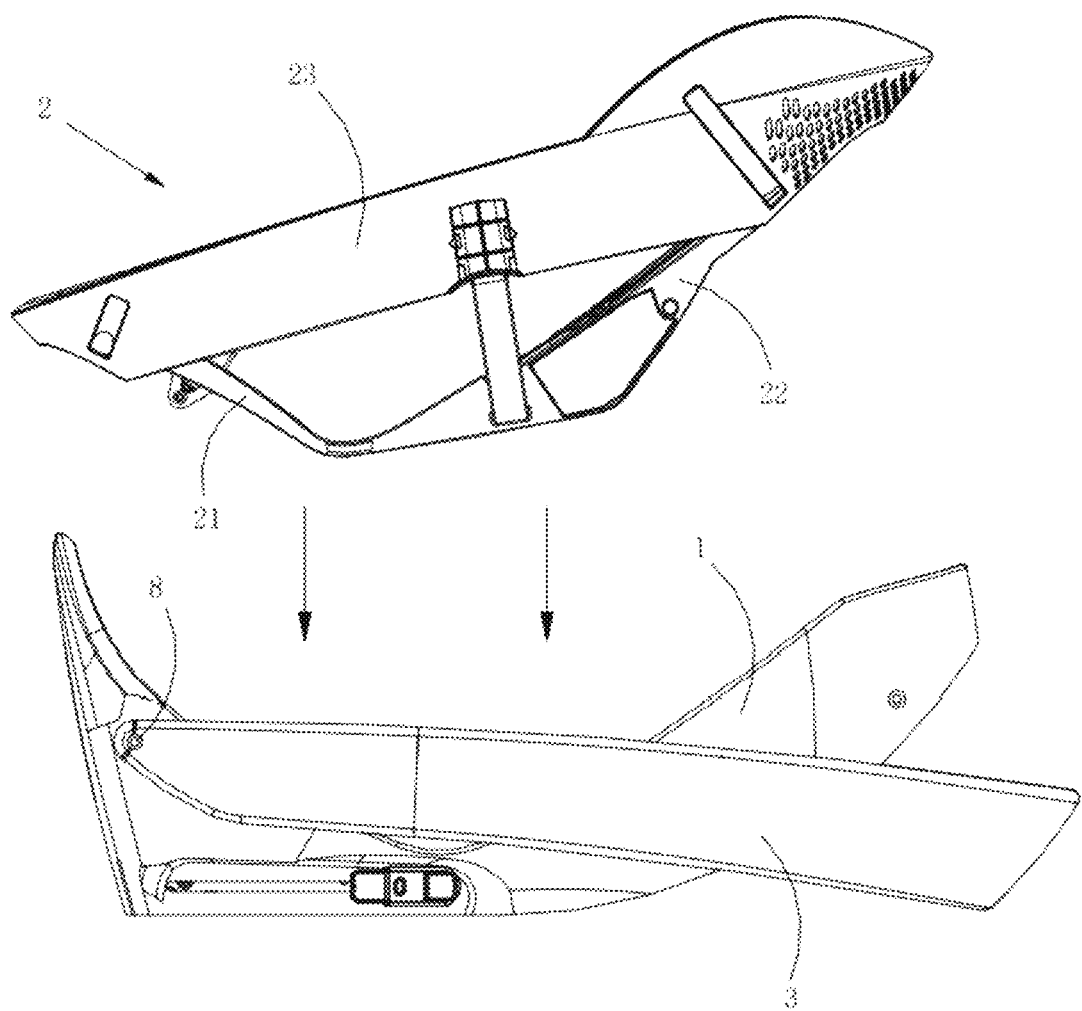
FIG. 7 is a schematic structure diagram of the lifting basket child safety seat of the present disclosure during the installation of the lifting basket (the rotation shaft extends along the left-right direction, and part of the base and the carry handle of the lifting basket are removed)
Figure 8:
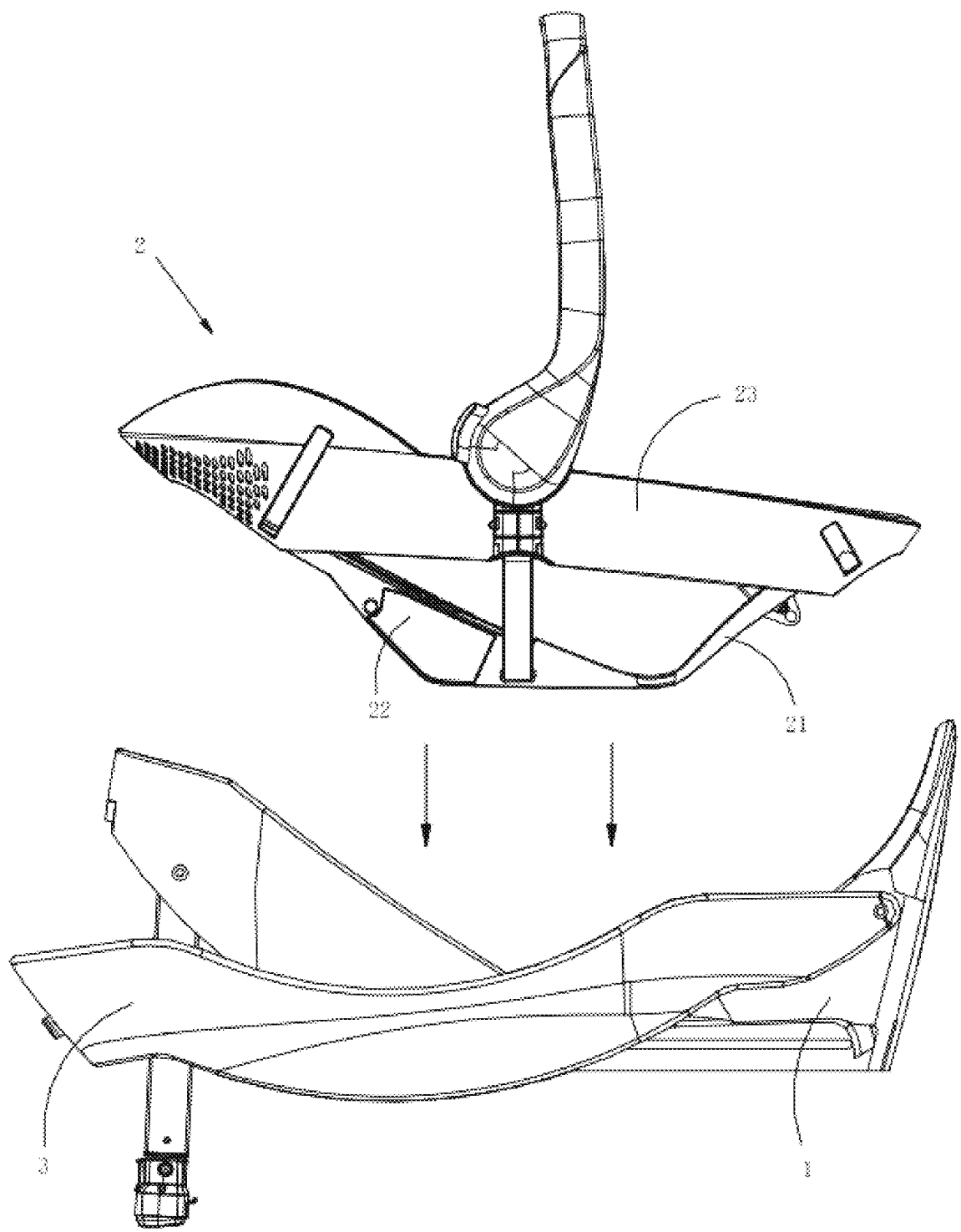
FIG. 8 is a schematic structure diagram of the lifting basket child safety seat of the present disclosure during the installation of the lifting basket (Embodiment 1, the rotation shaft extends along the left-right direction)

When the first locking mechanism is in the locked state, the position of the protection block 3 relative to the base 1 is fixed, and the protection block 3 is supported on the outer side of the lifting basket 2 in a standing manner, in this embodiment, the side guard bars 31 and the side blocks 23 on the same side are approximately corresponding to each other, and when observed from the side, the side guard bars 31 and the side blocks 23 at least partially overlap, and the protection block 3 is located on the outer side of the side blocks 23, in this way, in the event of a side impact of the car, the ability of the lifting basket 2 to withstand the side impact load can be increased, which can effectively reduce the damage to infants caused by the impact load generated by side impact, thus forming a safety protection for the infant lying in the lifting basket 2, as shown in FIG. 1 and FIG. 3.

Figure 9:
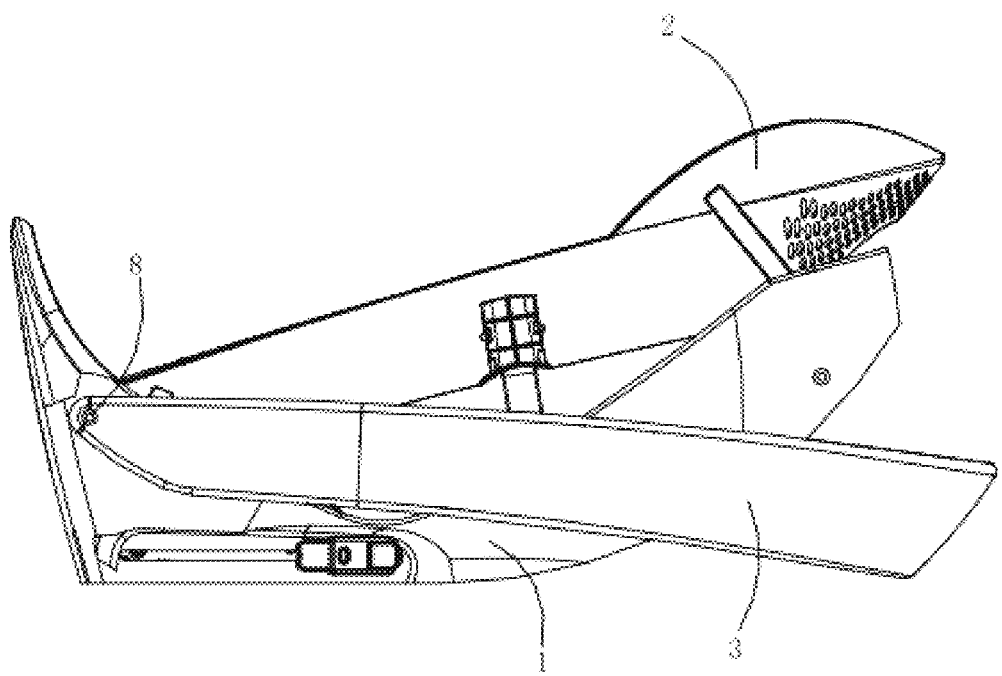
FIG. 9 is a schematic structure diagram of the lifting basket child safety seat of the present disclosure during the removal of the lifting basket (Embodiment 1, the rotation shaft extends along the left-right direction, and part of the base and the carry handle of the lifting basket are removed)

When the first locking mechanism is in the unlocked state, when the rotation shaft 8 extends along the left-right direction, the protection block 3 can rotate downwards relative to the base 1 to the lower part of the base 1 and is located on the outer side of the base 1, or when the rotation shaft 8 extends along the up-down direction, the protection block 3 can rotate relative to the base 1 towards the outer side of the lifting basket child safety seat, or when the rotation shaft 8 extends along the front-rear direction, the protection block 3 can rotate relative to the base 1 towards the outer side of the lifting basket child safety seat and rotate downwards at the same time, so that the protection block 3 can be kept away from the lifting basket 2, so as to facilitate the operation, and the lifting basket 2 can be removed from the base 1. When installing the lifting basket 2 on the base 1, the first locking mechanism is also in the unlocked state, the protection block 3 also rotates downwards relative to the base 1 to the lower part of the base 1 and is located on the outer side of the base 1, or rotates towards the outer side of the lifting basket child safety seat, or rotates towards the outer side of the lifting basket child safety seat and rotates downwards at the same time, so that the part of the base 1 for installing the lifting basket 2 is basically exposed, so as to facilitate the operation, and the lifting basket 2 can be installed on the base 1. Regardless of the installation or removal of the lifting basket 2, the space size occupied by the protection block 3 mostly overlaps with the base 1, so that the space size occupied by the protection block 3 alone is small, that is, only a small space needs to be reserved to realize the up and down flipping or left and right opening and closing of the protection block 3, which facilitates the use of the lifting basket child safety seat, as shown in FIG. 9.

The structure of the side guard bars 31 of the protection block 3 is preferably matched with that of the side blocks 23, in this way, when the protection block 3 is supported on the outer side of the side blocks 23 in a standing manner, it can completely shelter for the side blocks 23, so that the side impact load generated by the collision of the car is transmitted to the side blocks 23 through the protection block 3, which can effectively reduce the side impact load of the lifting basket 2, and can also make the overall appearance of the lifting basket child safety seat beautiful and neat, as shown in FIG. 3.

Figure 2:
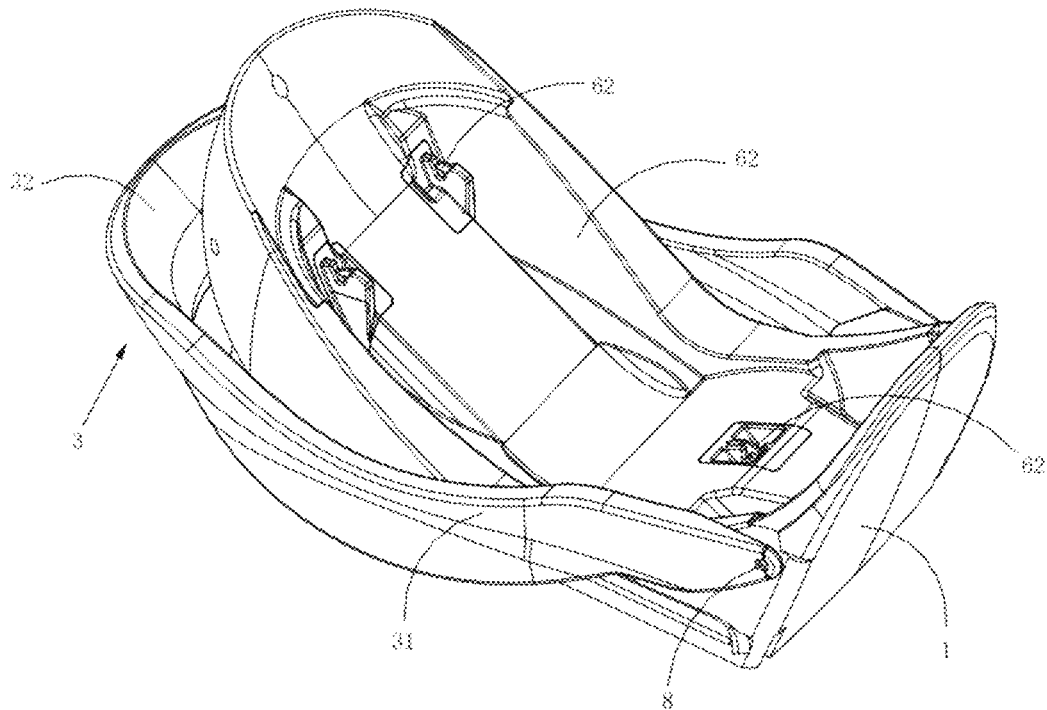
FIG. 2 is a schematic structure diagram of the lifting basket child safety seat of the present disclosure with the lifting basket removed (Embodiment 1, the rotation shaft extends along the left-right direction, and the first locking mechanism is in the locked state)

The structure of the upper portions of the side guard bars 31 of the protection block 3 is preferably matched with that of the upper portion of the side part of the base 1, which can also make the overall appearance of the lifting basket child safety seat beautiful and neat, specifically, the upper parts of the side guard bars 31 of the protection block 3 and the upper part of the side of the base 1 are curved, and the arrangement of the curved area can also form an avoidance space for the carry handle on the lifting basket 2, as shown in FIG. 1 and FIG. 2.

There are several kinds of first locking mechanism for locking the position of the protection block 3, several kinds of second locking mechanism for locking the position of the lifting basket 2, and many ways to unlock the first locking mechanism and the second locking mechanism, and several specific embodiments are given below.

Embodiment 1

Figure 10:
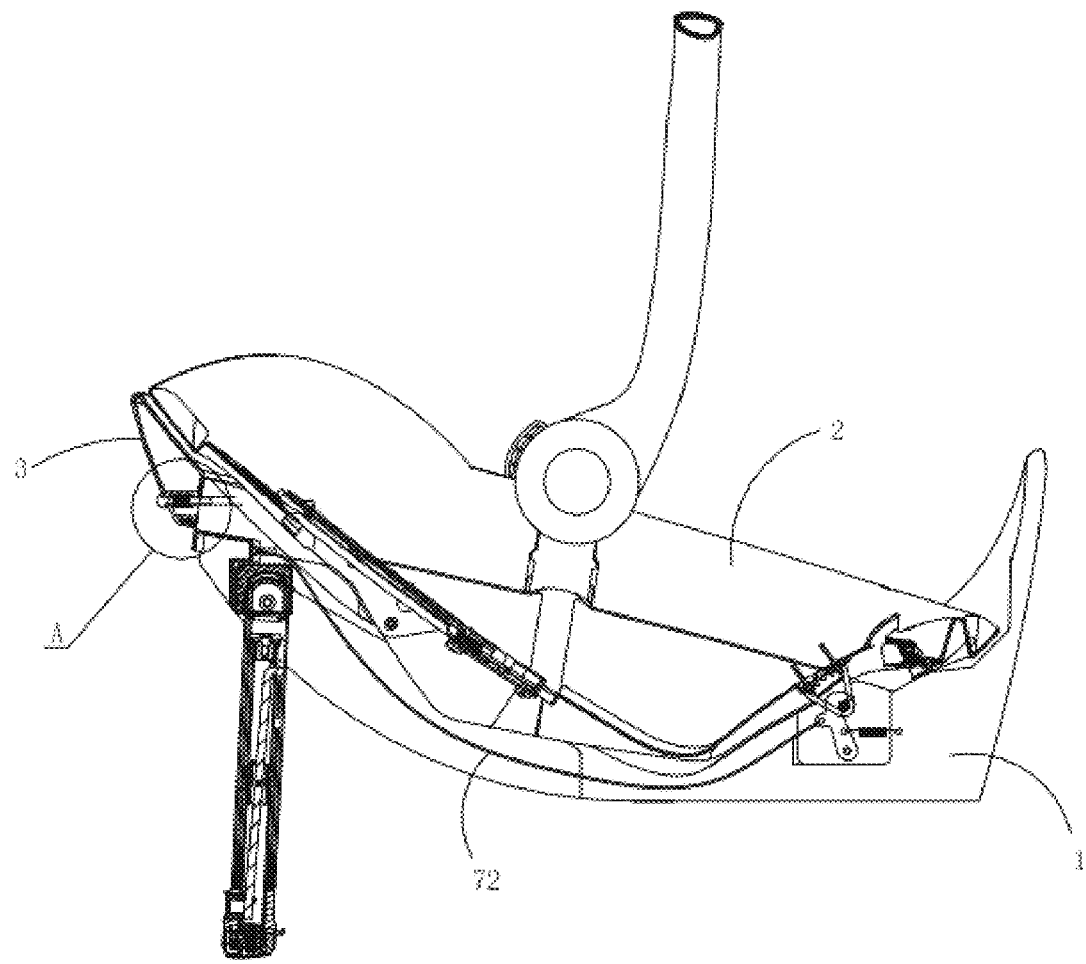
FIG. 10 is a schematic diagram of the inner structure of the lifting basket child safety seat of the present disclosure (Embodiment 1, the rotation shaft extends along the left-right direction, and the first locking mechanism is in the locked state)
Figure 11:
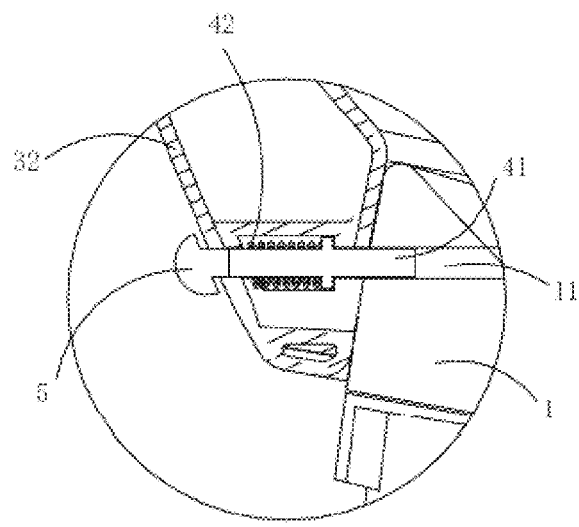
FIG. 11 is a partially enlarged view at Part A in FIG. 10.
Figure 12:
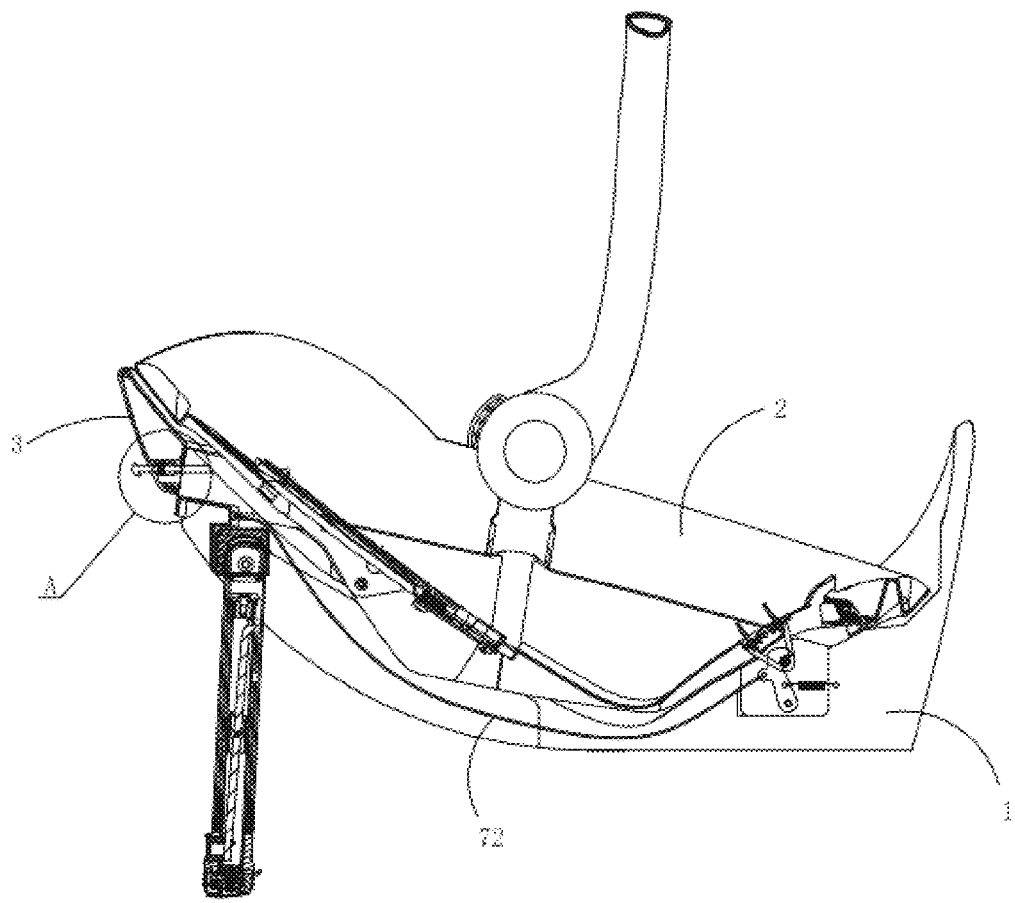
FIG. 12 is a schematic diagram of the inner structure of the lifting basket child safety seat of the present disclosure (Embodiment 1, the rotation shaft extends along the left-right direction, and the first locking mechanism is in the unlocked state)
Figure 13:
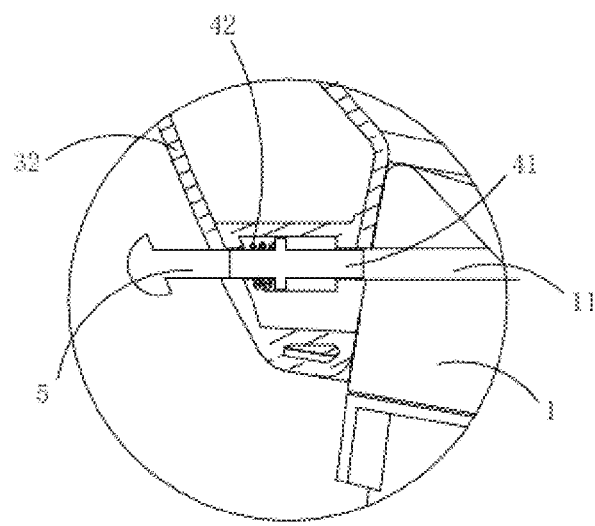
FIG. 13 is a partially enlarged view at Part A in FIG. 12.

The first locking mechanism is arranged between the protection block 3 and the base 1 to lock the relative positions of the two. Specifically, as shown in FIG. 10 to FIG. 13, the first locking mechanism comprises a first lock pin 41 slidably arranged on one of the protection block 3 and the base 1 and a lock slot 11 arranged on the other one of the protection block 3 and the base 1, and the lock slot 11 is matched with the first lock pin 41. When the first locking mechanism is in the locked state, the first lock pin 41 is inserted in the lock slot 11, as shown in FIG. 10 and FIG. 11; and when the first locking mechanism is in the unlocked state, the first lock pin 41 is removed from the lock slot 11, as shown in FIG. 12 and FIG. 13. In this embodiment, the first lock pin 41 can slidably arranged on the protection block 3 in the front-rear direction, and the lock slot 11 is arranged at the rear of the base 1.

The lifting basket child safety seat further comprises a first unlocking mechanism for driving the first locking mechanism to unlock. Specifically, as shown in FIG. 10 to FIG. 13, the first unlocking mechanism comprises a first unlocking member 5 slidably arranged on the base 1 or the protection block 3, the first unlocking member 5 is connected to or matched with the first lock pin 41. When the first unlocking member 5 is operated to slide relative to the base 1 or the protection block 3, the first lock pin 41 is driven to slide relative to the base 1 or the protection block 3, so as to remove from the lock slot 11, and the first locking mechanism is unlocked. In this embodiment, the first unlocking member 5 can slidably arranged on the protection block 3 in the front-rear direction, and the first unlocking member 5 and the first lock pin 41 are fixedly connected or integrally provided.

The first locking mechanism further comprises a first elastic element 42 for driving the first locking mechanism to reset from the unlocked state to the locked state, in this embodiment, the first elastic element 42 employs a spring, two end portions of the spring are respectively pushed against the first unlocking member 5, the first lock pin 41 and the protection block 3.

When the first locking mechanism is in the locked state, the lifting basket can also be installed on the base 1, or the lifting basket 2 can be removed from the base 1. When the first locking mechanism is unlocked by the first unlocking mechanism, the protection block 3 rotates downwards relative to the base 1 to the lower part of the base 1, or the protection block 3 rotates towards the outer side of the lifting basket child safety seat relative to the base 1, it is more convenient to install or remove the lifting basket 2.

Of course, the first locking mechanism may also be arranged between the protection block 3 and the lifting basket 2 to lock the relative positions of the two, at this time, the first locking mechanism is specifically arranged between the transverse guard bar 32 of the protection block 3 and the backrest 22 of the lifting basket 2. In this state, when the first locking mechanism is in the locked state, the lifting basket 2 cannot be installed on the base 1, or the lifting basket 2 cannot be removed from the base 1, only when the first locking mechanism is unlocked, and the protection block 3 rotates downwards relative to the base 1 to the lower part of the base 1, or the protection block 3 rotates towards the outer side of the lifting basket child safety seat relative to the base 1, the lifting basket 2 can be installed or removed.

The lifting basket child safety seat further comprises a second unlocking mechanism for driving the second locking mechanism to unlock. When the second locking mechanism is in the locked state, the lifting basket 2 is fixed on the base 1, after the second unlocking mechanism is operated to unlock the second locking mechanism, the lifting basket 2 can be removed from the base 1.

Figure 14:
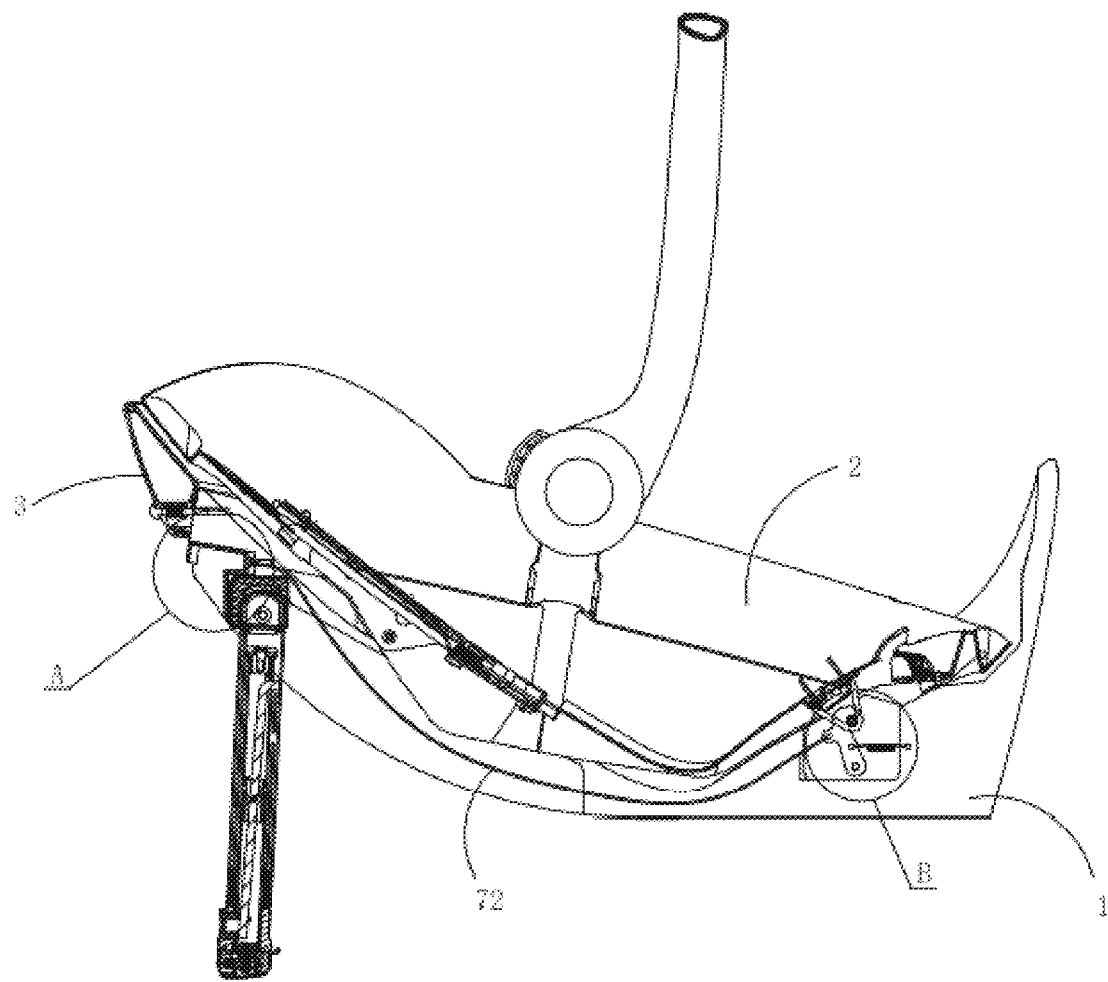
FIG. 14 is a schematic diagram of the inner structure of the lifting basket child safety seat of the present disclosure (Embodiment 1, the rotation shaft extends along the left-right direction, and the second locking mechanism is in the locked state)
Figure 15:
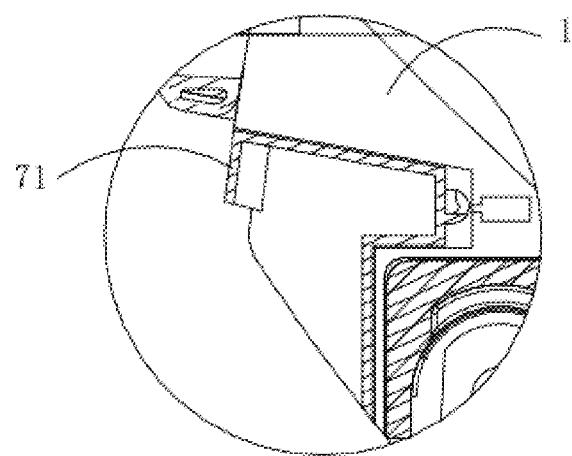
FIG. 15 is a partially enlarged view at Part A in FIG. 14.
Figure 16:
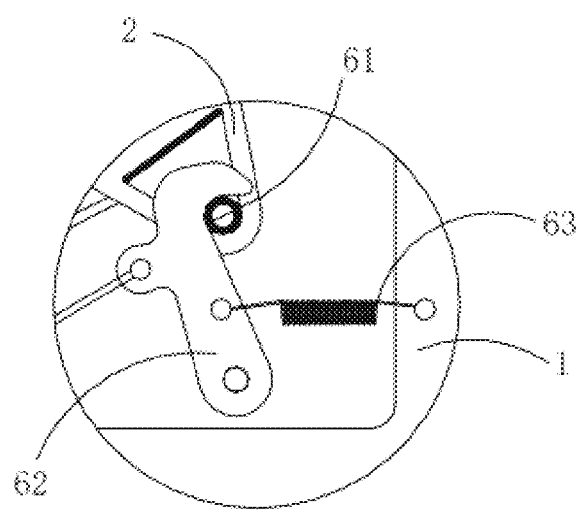
FIG. 16 is a partially enlarged view at Part B in FIG. 14.
Figure 17:
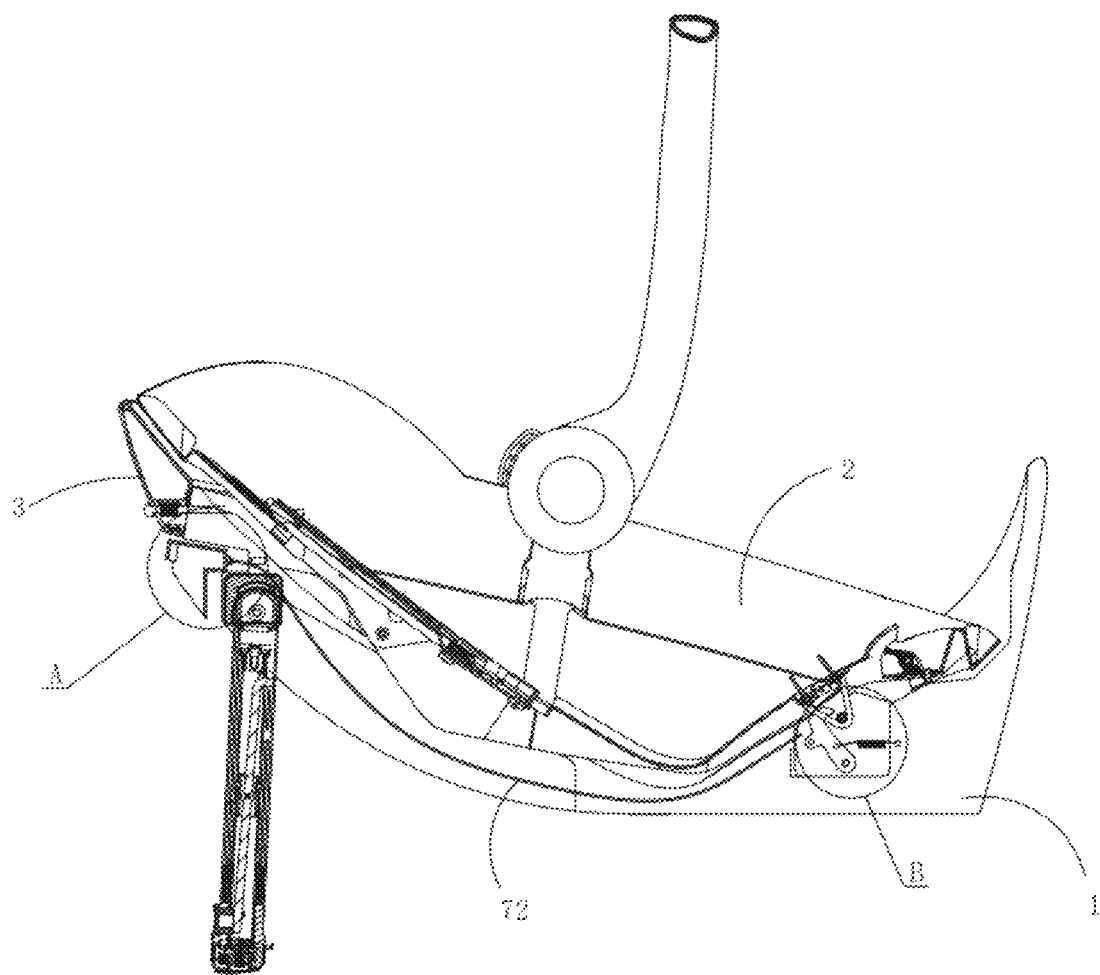
FIG. 17 is a schematic diagram of the inner structure of the lifting basket child safety seat of the present disclosure (Embodiment 1, the rotation shaft extends along the left-right direction, and the second locking mechanism is in the unlocked state)
Figure 18:
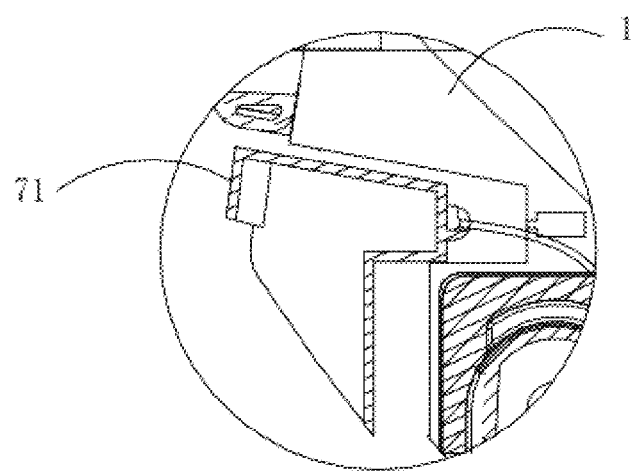
FIG. 18 is a partially enlarged view at Part A in FIG. 17.
Figure 19:
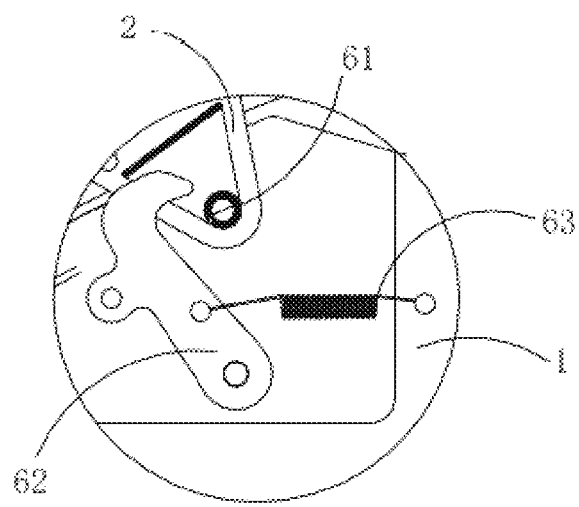
FIG. 19 is a partially enlarged view at Part B in FIG. 17.
Figure 20:
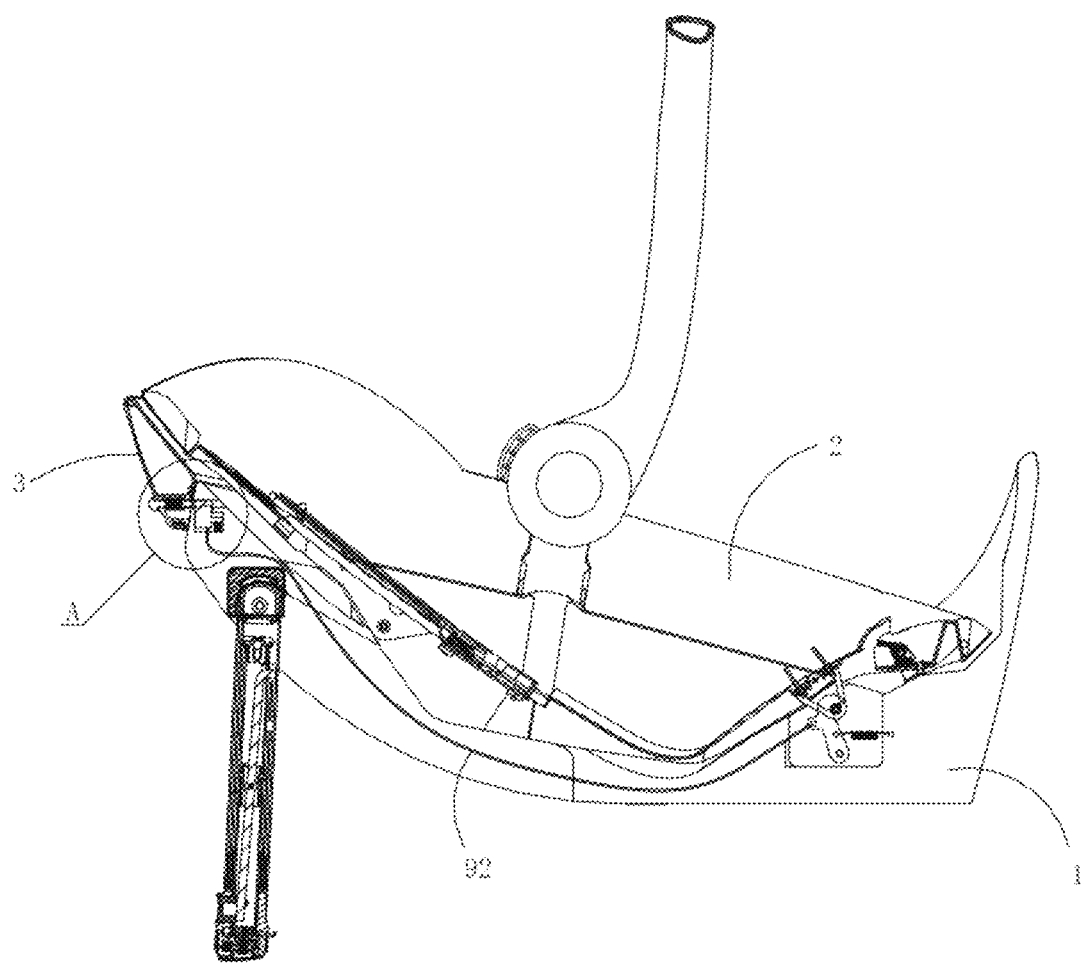
FIG. 20 is a schematic diagram of the inner structure of the lifting basket child safety seat of the present disclosure (Embodiment 2, the rotation shaft extends along the left-right direction, and the first locking mechanism and the second locking mechanism are both in the locked state)
Figure 21:
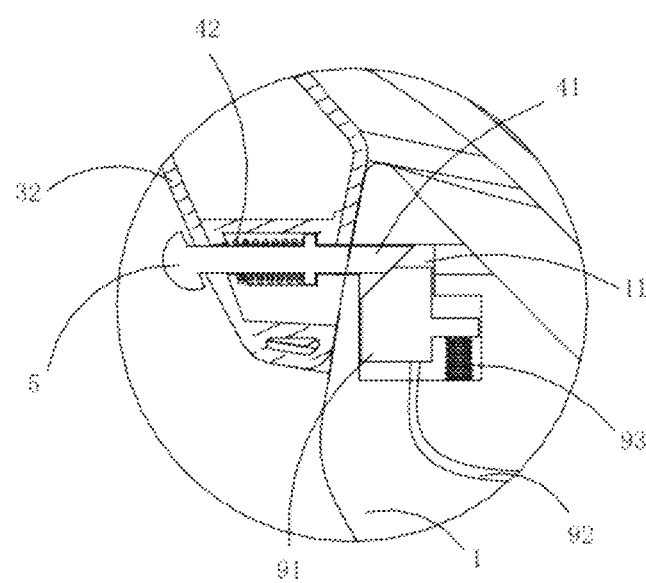
FIG. 21 is a partially enlarged view at Part A in FIG. 20.
Figure 22:
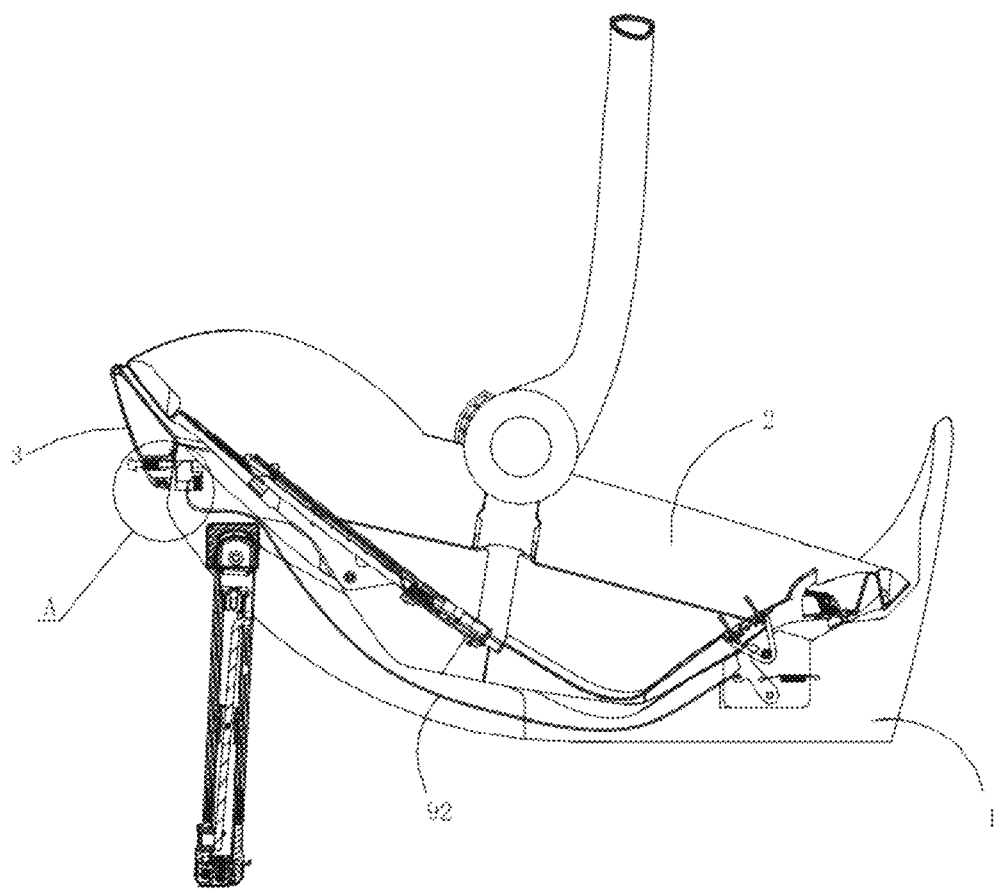
FIG. 22 is a schematic diagram of the inner structure of the lifting basket child safety seat of the present disclosure (Embodiment 2, the rotation shaft extends along the left-right direction, and the first locking mechanism and the second locking mechanism are both in the unlocked state)
Figure 23:
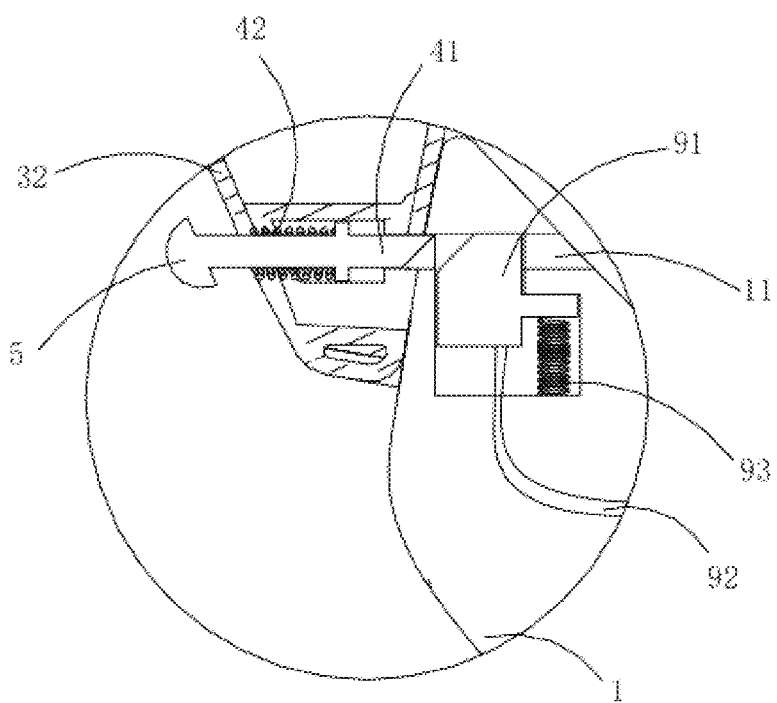
FIG. 23 is a partially enlarged view at Part A in FIG. 22.
Figure 24:
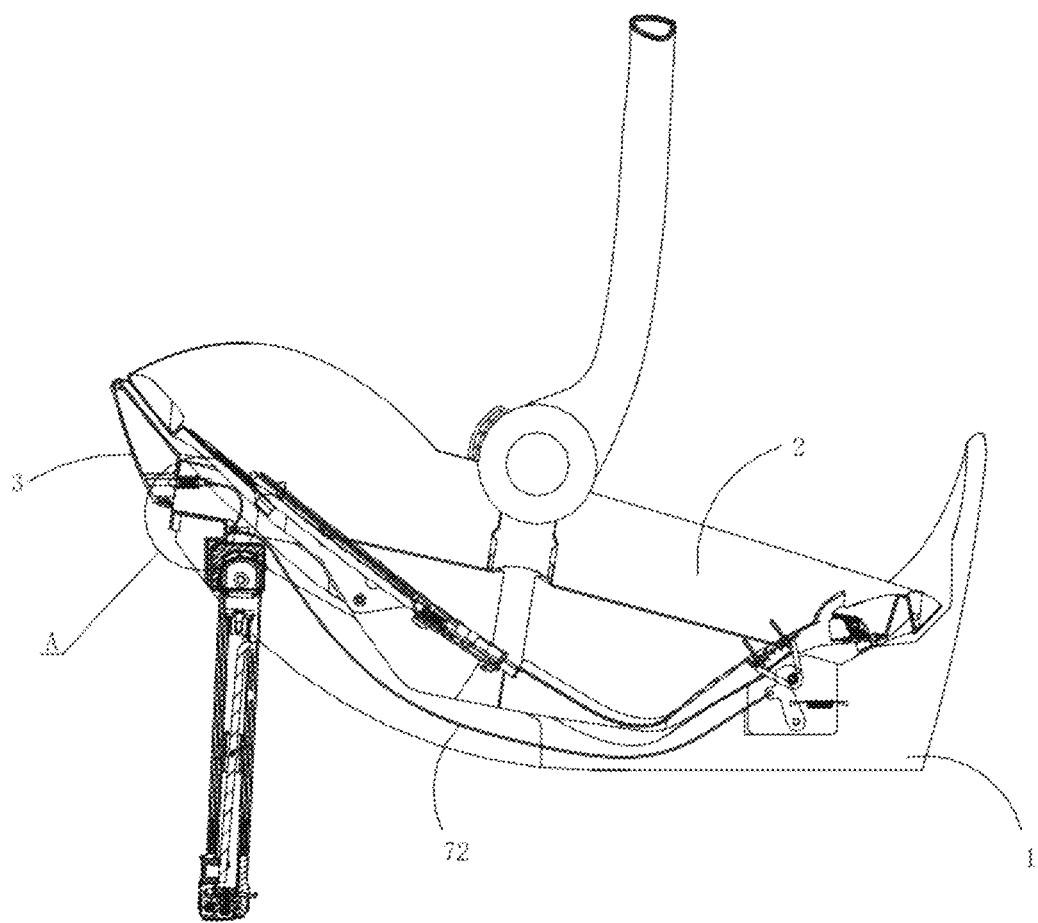
FIG. 24 is a schematic diagram of the inner structure of the lifting basket child safety seat of the present disclosure (Embodiment 3, the rotation shaft extends along the left-right direction, and the first locking mechanism and the second locking mechanism are both in the locked state)
Figure 25:
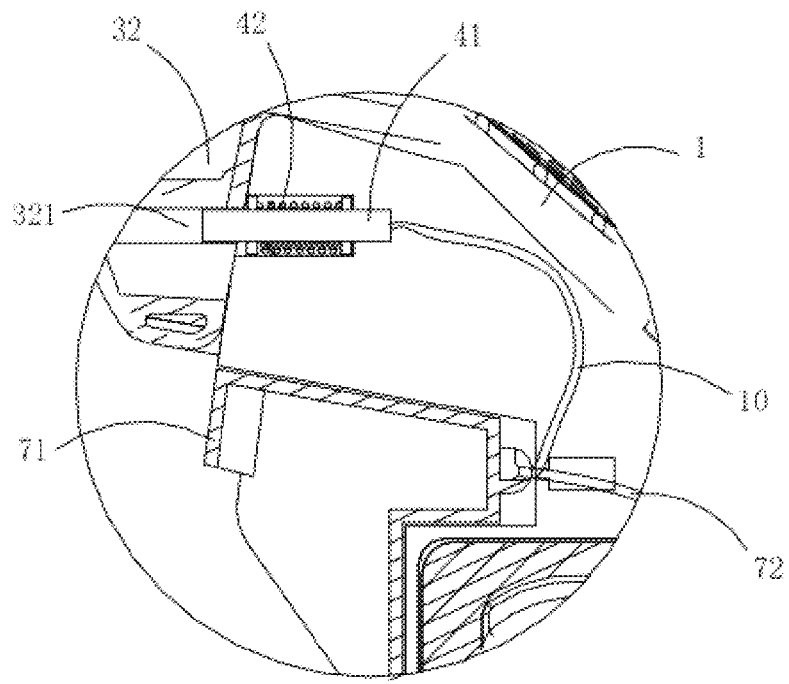
FIG. 25 is a partially enlarged view at Part A in FIG. 24.
Figure 26:
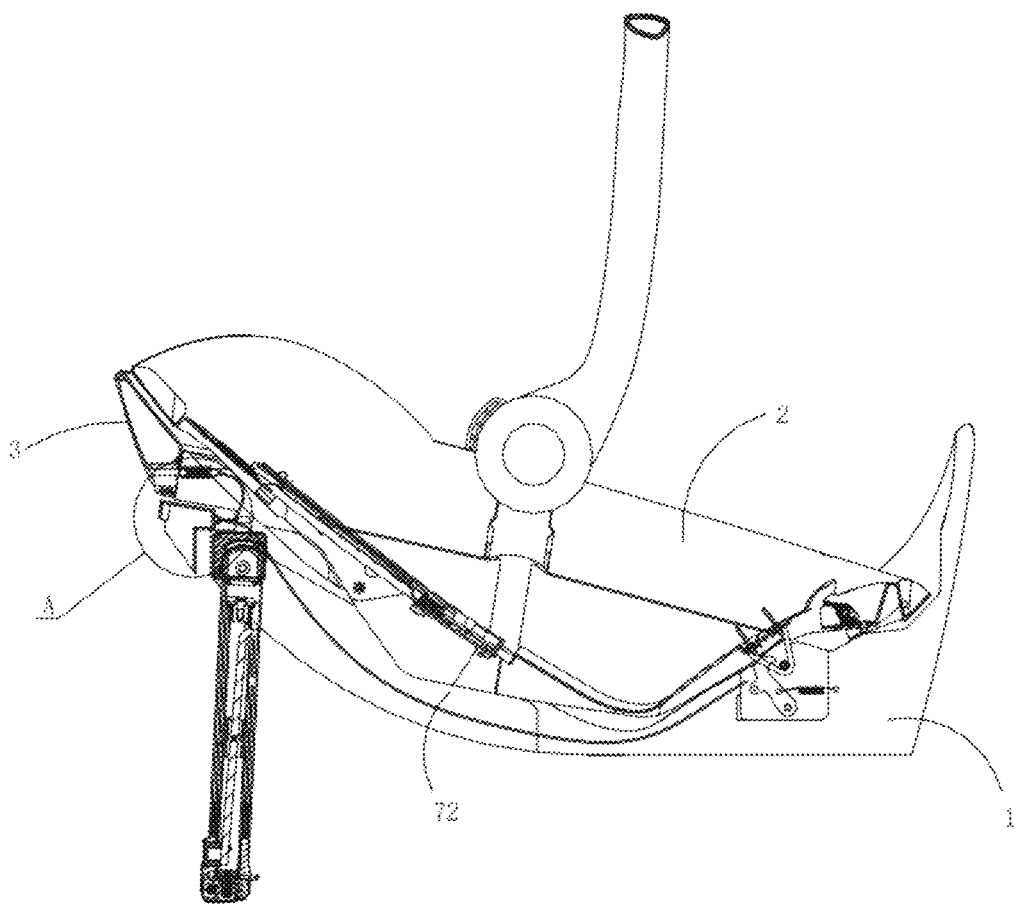
FIG. 26 is a schematic diagram of the inner structure of the lifting basket child safety seat of the present disclosure (Embodiment 3, the rotation shaft extends along the left-right direction, and the first locking mechanism and the second locking mechanism are both in the unlocked state)
Figure 27:
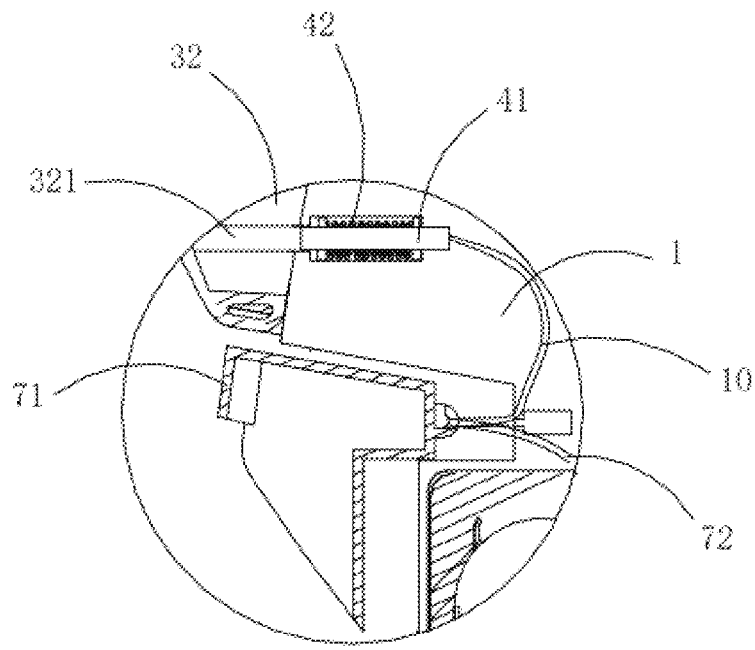
FIG. 27 is a partially enlarged view at Part A in FIG. 26.

Specifically, as shown in FIG. 14 to FIG. 19, the second locking mechanism comprises a second lock pin 61 fixedly arranged on the lifting basket 2, and a lock hook 62 rotatably arranged on the base 1, the lock hook 62 has a hook slot matched with the second lock pin 61. When the second locking mechanism is in the locked state, the second lock pin 61 is clamped in the hook slot of the lock hook 62, as shown in FIG. 14 and FIG. 16; and when the second locking mechanism is in the unlocked state, the second lock pin 61 is removed from the hook slot of the lock hook 62, as shown in FIG. 17 and FIG. 19.

As shown in FIG. 14 to FIG. 19, the second unlocking mechanism comprises a second unlocking member 71 slidably arranged on the base 1 and a first connector 72, one end portion of the first connector 72 is connected to the second unlocking member 71, and the other end portion of the first connector 72 is connected to the lock hook 62. When the second locking mechanism is in the locked state, when operating the second unlocking member 71 to slide relative to the base 1, the first connector 72 pulls the lock hook 62 to rotate relative to the base 1, so that the second lock pin 61 is removed from the hook slot of the lock hook 62, and the second locking mechanism is unlocked. In this embodiment, the first connector 72 adopts a first flexible connector, for example, the first connector 72 adopts a traction cable, two end portions of the traction cable are fixed on the second unlocking member 71 and the lock hook 62.

The second locking mechanism further comprises a second elastic element 63 for driving the second locking mechanism to reset from the unlocked state to the locked state, in this embodiment, the second elastic element 63 employs a tension spring, two end portions of the tension spring are respectively arranged on the lock hook 62 and the base 1.

In this embodiment, the second locking mechanism is respectively arranged on the left and right sides of the backrest 22 of the lifting basket 2 and between the seat part 21 and the base 1, the lock hook 62 of each second locking mechanism is connected to the same second unlocking member 71 through the traction cable.

The use of the lifting basket child safety seat is as follows:

When the lifting basket child safety seat needs to be used, first fixing the base 1 connected with the protection block 3 to the car seat; pulling the first unlocking member 5 to make it slide relative to the protection block 3, thereby driving the first lock pin 41 to slide in a direction removing from the first lock slot 11, until the first locking mechanism is unlocked; rotating the protection block 3 around the rotation shaft 8 to the lower part of the base 1 or the left and right sides of the base 1; placing the lifting basket 2 on the base 1, and when the lifting basket 2 is placed downward until the bottom of the basket 2 presses against the lock hook 62, rotating the lock hook 62 by a certain angle relative to the base 1 under its own gravity of the lifting basket 2, so that the lifting basket 2 can continue to be placed downward to be installed on the base 1, and when positioning the lifting basket 2 in place, the elastic force of the second elastic element 63 drives the lock hook 62 to rotate in an opposite direction, so that the second lock pin 61 enters the hook slot of the lock hook 62, and the second locking mechanism is in the locked state; after the protection block 3 is rotated upward around the rotation shaft 8 or towards the inner side of the lifting basket child safety seat to a set position, the positions of the protection block 3 and the base 1 can be locked again through the first locking mechanism. In this way, the lifting basket child safety seat is installed on the car seat.

When the lifting basket child safety seat needs to be removed from the car seat, first operating the first unlocking member 5 to unlock the first locking mechanism, after the first locking mechanism is unlocked, rotating the protection block 3 around the rotation shaft 8 to the lower part or left and right sides of the base 1; then operating the second unlocking member 71 to slide relative to the base 1 and pull the lock hook 62 by the traction cable to rotate relative to the base 1, so that the second lock pin 61 is removed from the hook slot of the lock hook 62, and the second locking mechanism is unlocked, at this time, the lifting basket 2 can be removed from the base 1, and after the lifting basket 2 is removed, the base 1 can be removed from the car seat.

Of course, in some specific cases, for example, when it is necessary to remove the lifting basket 2 when the corresponding space on the left and right sides or lower space of the lifting basket child safety seat is occupied, which leads to the inconvenient rotation of the protection block 3, the first locking mechanism can be kept in the locked state, only the second unlocking mechanism is operated to unlock the second locking mechanism, and the lifting basket 2 can also be removed from the base 1.

Embodiment 2

As shown in FIG. 20 to FIG. 23, in this embodiment, the unlocking operation of the first locking mechanism and the second locking mechanism can be realized in linkage manner, and there is no need to provide a second unlocking mechanism separately, and only operating the first unlocking mechanism can unlock the first locking mechanism and the second locking mechanism simultaneously.

Specifically, the lifting basket child safety seat further comprises a linkage structure between the first unlocking member 5 and the lock hook 62, the linkage structure comprises a sliding block 91 that can slide along the up-down direction on the base 1, and a third elastic element 93. The sliding block 91 and the first lock pin 41 are matched with each other via a slope, and the sliding block 91 is connected to the lock hook 62 via a second flexible connector 92. The third elastic element 93 adopts a spring, and two end portions of the spring are respectively arranged on the sliding block 91 and the base 1.

In this embodiment, the first lock pin 41 can slidably arranged on the protection block 3 in the front-rear direction, and the lock slot 11 is arranged on the base 1.

When the first locking mechanism and the second locking mechanism are both in the locked state, when the first unlocking member 5 is operated to slide relative to the protection block 3, which can pull the first lock pin 41 to slide relative to the protection block 3 and to be removed from the lock slot 11, and the first locking mechanism is unlocked; after the first lock pin 41 slides a distance relative to the protection block 3, the sliding block 91 slides upward relative to the base 1 under the action of the elastic force of the third elastic element 93, and pulls the lock hook 62 via the second flexible connector 92 to rotate relative to the base 1, so that the second lock pin 61 is removed from the hook slot of the lock hook 62, and the second locking mechanism is unlocked, as shown in FIG. 20 to FIG. 23.

When the first unlocking member 5 is released, the elastic force of the first elastic element 42 drives the first lock pin 41 to slide in the opposite direction and reset relative to the protection block 3, and by means of the inclined plane matching between the sliding block 91 and the first lock pin 41, the sliding block 91 is driven to slide down relative to the base 1, the second flexible connector 92 is released, and the lock hook 62 is rotated in the opposite direction and reset under the action of the elastic force of the second elastic element 63, so that the first locking mechanism and the second locking mechanism are locked again.

Embodiment 3

As shown in FIG. 24 to FIG. 27, in this embodiment, the unlocking operation of the first locking mechanism and the second locking mechanism can be realized in linkage manner, and there is no need to provide a first unlocking mechanism separately, and only operating the second unlocking mechanism can unlock the first locking mechanism and the second locking mechanism simultaneously.

In this embodiment, the first lock pin 41 can slidably arranged on the base 1, and the lock slot 321 is arranged on the protection block 3.

The lifting basket child safety seat further comprises a third flexible connector 10 with two end portions fixedly connected to the first lock pin 41 and the second unlocking member 71 respectively. In this embodiment, the first elastic element 42 is arranged between the first lock pin 41 and the base 1.

When the first locking mechanism and the second locking mechanism are both in the locked state, when operating the second unlocking member 71 to slide relative to the base 1 in a direction away from the base 1, the first connector 72 pulls the lock hook 62 to rotate relative to the base 1, so that the second lock pin 61 is removed from the hook slot of the lock hook 62, and the second locking mechanism is unlocked. At the same time, the third flexible connector 10 pulls the first lock pin 41 to slide relative to the base 1 and be removed from the lock slot 321, and the first locking mechanism is unlocked, as shown in FIG. 24 to FIG. 27.

Embodiment 4

As shown in FIG. 28 to FIG. 33, in this embodiment, when the first locking mechanism is unlocked, and the protection block 3 is rotated in the direction away from the base 1 relative to the base 1, the second locking mechanism can be unlocked, so that there is no need to provide a second unlocking mechanism separately.

Figure 28:
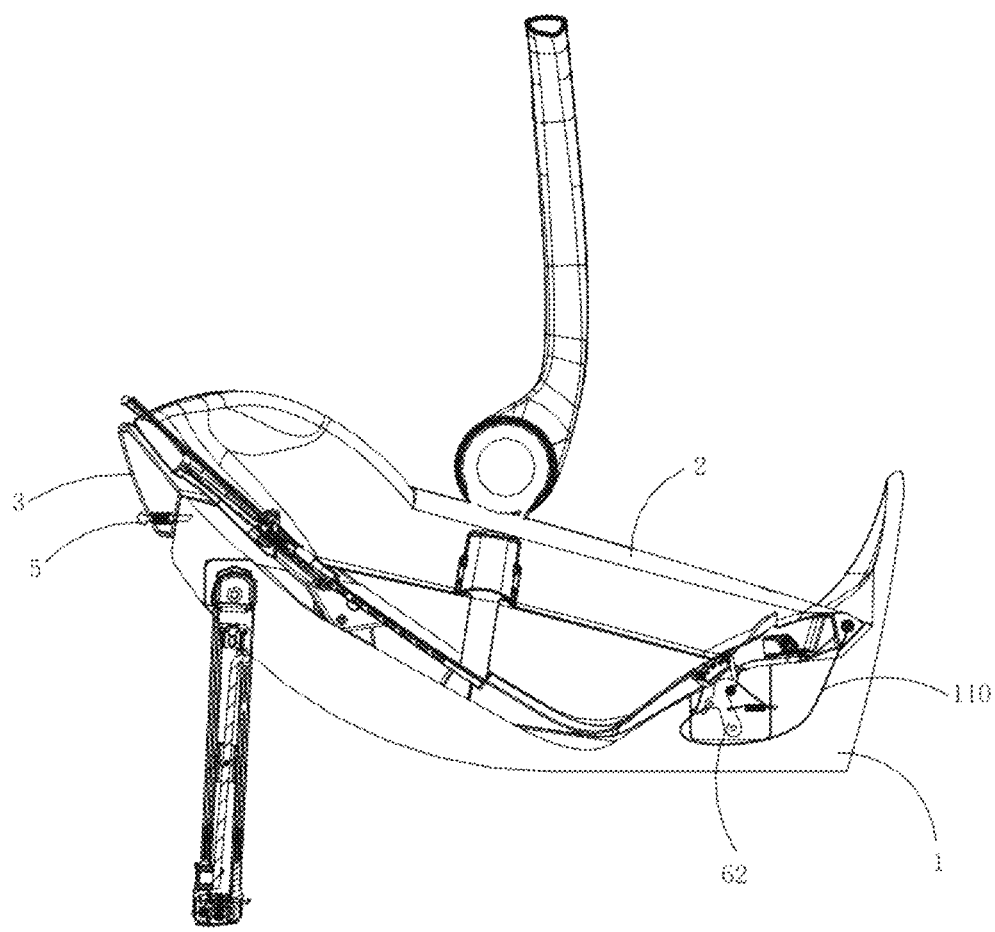
FIG. 28 is a schematic diagram of the inner structure of the lifting basket child safety seat of the present disclosure (Embodiment 4, the rotation shaft extends along the left-right direction, and the first locking mechanism and the second locking mechanism are both in the locked state)

Specifically, the lifting basket child safety seat further comprises a second connector 110, one end portion of the second connector 110 is fixed on the side guard bars 31, and the other end portion of the second connector 110 is fixed on the lock hook 62, as shown in FIG. 28 and FIG. 33. In this embodiment, the second connector 110 adopts a fourth flexible connector.

In this embodiment, the specific structures of the first locking mechanism and the first unlocking mechanism can be the same as in Embodiment 1, the first lock pin 41 and the first unlocking member 5 are fixedly connected or integrally provided, which can slidably arranged on the protection block 3 in the front-rear direction, and the lock slot 11 is arranged at the rear of the base 1.

When operating the first unlocking member 5 to unlock the first locking mechanism, the protection block 3 can rotate downwards relative to the base 1 and/or towards the outer side of the lifting basket child safety seat so as to keep away from the base 1, and during the rotation of the protection block 3, the fourth flexible connector is pulled, and the fourth flexible connector pulls the lock hook 62 to rotate relative to the base 1, so that the second lock pin 61 is removed from the hook slot of the lock hook 62, and the second locking mechanism is unlocked.

Embodiment 5

In this embodiment, when the first locking mechanism is unlocked, and the protection block 3 is rotated in the direction away from the base 1 relative to the base 1, the second locking mechanism can be unlocked, in this way, there is no need to provide a second unlocking mechanism separately, and the specific arrangement is the same as in Embodiment 4.

This embodiment differs from Embodiment 4 by that the structure of the first unlocking mechanism is slightly different, and in this embodiment, the first lock pin 41 and the first unlocking member 5 are not directly connected, and the two are connected via a fifth flexible connector (not shown in the drawings), as shown in FIG. 34 to FIG. 36.

When operating the first unlocking member 5, and the fifth flexible connector makes the first clock pin 41 to slide, so as to unlock the first locking mechanism, the protection block 3 can rotate downwards relative to the base 1 and/or towards the outer side of the lifting basket child safety seat so as to keep away from the base 1, and during the rotation of the protection block 3, the fourth flexible connector is pulled, and the fourth flexible connector pulls the lock hook 62 to rotate relative to the base 1, so that the second lock pin 61 is removed from the hook slot of the lock hook 62, and the second locking mechanism is unlocked.

The above definition of directions is based on the infant lying in the lifting basket as a reference, and the direction in which the infant's face is facing is forward.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

The invention claimed is:

1. A lifting basket child safety seat, comprising:
a base;
a lifting basket detachably arranged on the base;
a protection block located on an outer side of the base and rotationally connected to a left side and a right side of the base respectively;
a first locking mechanism for locking a position of the protection block;
wherein, when the first locking mechanism is in a locking state, the protection block is supported on an outer side of the lifting basket in a standing manner, and when the first locking mechanism is in an unlocked state, the protection block is capable of rotating downwards relative to the base and/or towards an outer side of the lifting basket child safety seat, such that the protection block is capable of being away from the lifting basket;
a first unlocking mechanism; and
a second locking mechanism for locking the relative positions of the lifting basket and the base;
wherein, the first unlocking mechanism is respectively connected to or matched with the first locking mechanism and the second locking mechanism, and when the first unlocking mechanism is operated, the first locking mechanism and the second locking mechanism are driven to unlock simultaneously;
wherein the first locking mechanism comprises a first lock pin slidably arranged on the protection block, and a lock slot arranged on the base and able to be matched with or detached from the first lock pin, the second locking mechanism comprises a second lock pin fixedly arranged on the lifting basket, and a lock hook rotatably arranged on the base and matched with or detached from the second lock pin, the first unlocking mechanism comprises a first unlocking member slidably arranged on the base or the protection block, the first unlocking member is connected to or matched with the first lock pin, the lifting basket child safety seat further comprises a sliding block slidably arranged on the base, a second flexible connector and a third elastic element, the sliding block is matched with the first lock pin via a slope, two end portions of the second flexible connector are fixedly connected to the sliding block and the lock hook respectively, and two end portions of the third elastic element are arranged on the sliding block and the base respectively.

2. A lifting basket child safety seat according to claim 1, wherein the first locking mechanism comprises a first lock pin slidably arranged on one of the base and the protection block, and a lock slot arranged on the other one of the base and the protection block, the lock slot is matched with the first lock pin, when the first locking mechanism is in the locked state, the first lock pin is inserted in the lock slot, and when the first locking mechanism is in the unlocked state, the first lock pin is removed from the lock slot, the first locking mechanism further comprises a first elastic element for driving the first locking mechanism to reset from the unlocked state to the locked state.

3. A lifting basket child safety seat according to claim 1, wherein the protection block is rotatably connected to the base via a rotation shaft, the rotation shaft is located at the front end portion of the protection block, the rotation shaft extends in a left-right direction, and when the first locking mechanism is in the unlocked state, the protection block is capable of rotating downwards relative to the base around the rotation shaft.

4. A lifting basket child safety seat according to claim 1, wherein two protection blocks are rotatably connected to the base via rotation shafts, the rotation shafts are located at the front end portion of the protection blocks, the rotation shafts extends in an up-down direction, and when the first locking mechanism is in the unlocked state, the protection blocks are capable of rotating towards the outer side of the lifting basket child safety seat relative to the base around the rotation shafts.

5. A lifting basket child safety seat, comprising:
a base;
a lifting basket detachably arranged on the base;
protection blocks located on an outer side of the base and rotationally connected to a left side and a right side of the base respectively; and
a first locking mechanism for locking a position of the protection block;
wherein, when the first locking mechanism is in a locking state, the protection blocks are supported on an outer side of the lifting basket in a standing manner, and when the first locking mechanism is in an unlocked state, the protection blocks are capable of rotating downwards relative to the base and/or towards an outer side of the lifting basket child safety seat, such that the protection blocks are capable of being away from the lifting basket;
wherein each of the protection blocks is rotatably connected to the base via a rotation shaft, the rotation shaft is located in the middle of the each protection block, the rotation shaft extends in a front-rear direction, and when the first locking mechanism is in the unlocked state, each of the protection blocks is capable of rotating towards the outer side of the lifting basket child safety seat relative to the base around the rotation shaft and rotate downwards.

6. A lifting basket child safety seat according to claim 5, wherein the lifting basket child safety seat further comprises a second locking mechanism for locking the relative positions of the lifting basket and the base, and when the first locking mechanism is unlocked and the protection block is rotated relative to the base in a direction away from the base, the second locking mechanism is driven to unlock, the lifting basket child safety seat further comprises a second connector for connecting the protection block to the second locking mechanism.

7. A lifting basket child safety seat according to claim 6, wherein the second locking mechanism comprises a second lock pin fixedly arranged on the lifting basket, and a lock hook rotatably arranged on the base and matched with or detached from the second lock pin, and the second connector is a fourth flexible connector, two end portions of the fourth flexible connector are respectively connected to the protection block and the lock hook.

8. A lifting basket child safety seat, comprising:
a base;
a lifting basket detachably arranged on the base;
protection blocks located on an outer side of the base and rotationally connected to a left side and a right side of the base respectively; and
a first locking mechanism for locking a position of the protection block;
wherein, when the first locking mechanism is in a locking state, the protection blocks are supported on an outer side of the lifting basket in a standing manner, and when the first locking mechanism is in an unlocked state, the protection blocks are capable of rotating downwards relative to the base and/or towards an outer side of the lifting basket child safety seat, such that the protection blocks are capable of being away from the lifting basket;
wherein each the protection blocks is rotatably connected to the base via a rotation shaft, the rotation shaft is located at the front end portion of each protection block, the rotation shaft extends in an up-down direction, and when the first locking mechanism is in the unlocked state, each of the protection blocks is capable of rotating towards the outer side of the lifting basket child safety seat relative to the base around the rotation shaft.

9. A lifting basket child safety seat according to claim 8, wherein the lifting basket child safety seat further comprises a second locking mechanism for locking the relative positions of the lifting basket and the base, and when the first locking mechanism is unlocked and the protection block is rotated relative to the base in a direction away from the base, the second locking mechanism is driven to unlock, the lifting basket child safety seat further comprises a second connector for connecting the protection block to the second locking mechanism.

10. A lifting basket child safety seat according to claim 9, wherein the second locking mechanism comprises a second lock pin fixedly arranged on the lifting basket, and a lock hook rotatably arranged on the base and matched with or detached from the second lock pin, and the second connector is a fourth flexible connector, two end portions of the fourth flexible connector are respectively connected to the protection block and the lock hook.

* * * * *